(12) United States Patent
Chung et al.

(10) Patent No.: US 10,356,151 B2
(45) Date of Patent: Jul. 16, 2019

(54) VIDEO STREAMING DIAGNOSTICS

(71) Applicants: ASSIA SPE, LLC, Wilmington, DE (US); AT&T INTELLECTUAL PROPERTY I, L.P., Reno, NV (US)

(72) Inventors: Seong Taek Chung, Redwood City, CA (US); Georgios Ginis, San Mateo, CA (US); Peter J. Silverman, Evanston, IL (US); Philip Bednarz, Fremont, CA (US); Raghvendra Savoor, Walnut Creek, CA (US); Zhi Li, San Ramon, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 14/952,635

(22) Filed: Nov. 25, 2015

(65) Prior Publication Data

US 2016/0080460 A1   Mar. 17, 2016

Related U.S. Application Data

(63) Continuation of application No. 12/226,911, filed as application No. PCT/US2007/067720 on Apr. 27, 2007, now abandoned.

(Continued)

(51) Int. Cl.
*H04B 3/46* (2015.01)
*H04L 29/06* (2006.01)
(Continued)

(52) U.S. Cl.
CPC .............. *H04L 65/80* (2013.01); *H04B 3/46* (2013.01); *H04L 12/6418* (2013.01);
(Continued)

(58) Field of Classification Search
CPC ............ H04N 17/04; H04N 21/44008; G06K 9/6232; H04B 3/46; H04L 12/6418;
(Continued)

(56) References Cited

U.S. PATENT DOCUMENTS 7,173,947 B1 * 2/2007 Ramakrishnan ............................ H04N 21/23418 370/242
7,940,870 B2 * 5/2011 Van de Wiel ............ H04B 3/32 375/222

(Continued)

FOREIGN PATENT DOCUMENTS

CN   1933432    3/2007
WO   2002010944 2/2002
(Continued)

OTHER PUBLICATIONS

Non-Final Office Action dated Sep. 13, 2012, for U.S. Appl. No. 12/226,911.

(Continued)

*Primary Examiner* — Jerry B Dennison
(74) *Attorney, Agent, or Firm* — North Weber and Baugh LLP

(57) ABSTRACT

A video stream DSL analyzer receives at least non-physical layer management data and physical layer management data and in response generates metric information. The generated metric information is used to characterize the performance of the video stream information and diagnose any problems if necessary. In response to the metric information, the video stream DSL analyzer changes one or more DSL configuration(s) in order to improve performance.

20 Claims, 14 Drawing Sheets

Related U.S. Application Data

(60) Provisional application No. 60/796,371, filed on May 1, 2006.

(51) Int. Cl.
    *H04M 3/30*     (2006.01)
    *H04M 11/06*     (2006.01)
    *H04L 12/64*     (2006.01)
    *H04L 12/26*     (2006.01)
    *H04L 29/08*     (2006.01)

(52) U.S. Cl.
    CPC ........ *H04L 43/0882* (2013.01); *H04L 69/323* (2013.01); *H04M 3/304* (2013.01); *H04M 11/062* (2013.01); *H04L 2012/6478* (2013.01)

(58) Field of Classification Search
    CPC ......... H04L 2012/6478; H04L 43/0882; H04L 65/80; H04L 69/323; H04M 11/062; H04M 3/304
    USPC .......................................................... 709/224
    See application file for complete search history.

(56) References Cited

U.S. PATENT DOCUMENTS

| | | | |
|---|---|---|---|
| 2006/0072722 A1 | 4/2006 | Savoor et al. | |
| 2007/0230548 A1* | 10/2007 | Van de Wiel | H04B 3/32 375/219 |
| 2007/0234135 A1* | 10/2007 | Boyes | H04L 1/20 714/704 |
| 2009/0175199 A1* | 7/2009 | Trojer | H04L 12/2856 370/254 |

FOREIGN PATENT DOCUMENTS

| | | |
|---|---|---|
| WO | 2005057837 | 6/2005 |
| WO | 01059895 | 8/2011 |

OTHER PUBLICATIONS

Non-Final Office Action dated Jan. 9, 2015, for U.S. Appl. No. 12/226,911.
Final Office Action dated Apr. 13, 2013, for U.S. Appl. No. 12/226,911.
Final Office Action dated May 29, 2015, for U.S. Appl. No. 12/226,911.
Notice of Allowance dated Nov. 19, 2013, for EP Patent Application No. 07761536.7.
Second Notice of Allowance dated Aug. 19, 2014, for EP Patent Application No. 07761536.7.
Non-Final Office action dated Feb. 28, 2013, for EP Patent Application No. 07761536.7.
Notice of Allowance dated May 6, 2013, for Chinese Patent Application No. 200780021498.8.
Non-Final Office Action dated Mar. 24, 2011, for Chinese Patent Application No. 200780021498.8.
Non-Final Office Action dated Nov. 8, 2011, for Japanese Patent Application No. 2009-509981.
Second Office Action dated Feb. 6, 2012, for Chinese Patent Application No. 200780021498.8.
Notice of Allowance dated May 28, 2011, for Japanese Patent Application No. 2009-509981.
Extended European Search Report, dated Oct. 20, 2011 for EP Patent Application No. EP11165195.
Third Office Action dated Oct. 29, 2012, for Chinese Patent Application No. 200780021498.8.
International Search Report and Written Opinion dated Nov. 15, 2007, for PCT Application No. PCT/US07/67720.
International Preliminary Report on Patentability dated Nov. 13, 2008, for PCT Application No. PCT/US07/67720.
Alliance for Telecommunications Industry Solutions, "Framework for QoS Metrics an Measurements Supporting IPTV Services", Alliance for Telecommunication Industry Solutions, Approved Nov. 2006.

* cited by examiner

| Quality | Video Codec standard | Minimum Bit Rate (video only) |
|---|---|---|
| Standard Definition | MPEG-2 - Main profile at Main level (MP@ML) | 2.5 Mbps CBR |
| Standard Definition | MPEG-4 AVC (Main profile at Level 3) | 1.75 Mbps CBR |
| Standard Definition | SMPTE VC-1 | 1.75 Mbps CBR |
| Standard Definition – VoD/Premium | MPEG-2 - Main profile at Main level (MP@ML) | 3.18 Mbps CBR |
| Standard Definition – VoD/Premium | MPEG-4 AVC (Main profile at Level 3) | 2.1 Mbps CBR |
| Standard Definition – VoD/Premium | SMPTE VC-1 | 2.1 Mbps CBR |
| High Definition | MPEG-2 - Main profile at High level (MP@HL) | 15 Mbps CBR |
| High Definition | MPEG-4 AVC (Main profile at Level 4) | 10 Mbps CBR |
| High Definition | SMPTE VC-1 | 10 Mbps CBR |

EXAMPLE MINIMUM BIT RATE FOR VIDEO

| Audio Codec standard | Minimum Bit Rate (audio only) |
|---|---|
| MPEG Layer II | 128 for stereo |
| Dolby Digital (AC-3) | 384 for 5.1 / 128 for stereo |
| AAC | 96 for stereo |
| MP3 (MPEG-1, Layer 3) | 128 |

EXAMPLE MINIMUM BIT RATE FOR AUDIO

| User Action | Examples | Category | Maximum Recommended Delay |
|---|---|---|---|
| User interface actions | EPG scrolling. VoD remote control button push to onscreen indication that command was received (ex. pause symbol displayed) | Interactive | 200 ms |
| Channel Change | Time from remote control button push until stable channel is displayed on TV | Responsive | 2 seconds |
| System start-up time | Time from STB power on to channel availability | Timely | 10 seconds |

EXAMPLE MAXIMUM RECOMMENDED DELAY

FIG. 6

| Parameter | Description | G.997.1 references | PHY references |
|---|---|---|---|
| VTU-O line performance monitoring | | | |
| FECS-L counter | Count of 1-second intervals with one or more FEC anomalies | 7.2.1.1-2, 7.2.6 | Table 11-17/G.993.2 |
| ES-L counter | Count of 1-second intervals with one or more CRC-8 anomalies, or one or more LOS/SEF/LPR defects | 7.2.1.1-2, 7.2.6 | Table 11-17/G.993.2 |
| SES-L counter | Count of 1-second intervals with more than 18 CRC-8 anomalies, or one or more LOS/SEF/LPR defects | 7.2.1.1-2, 7.2.6 | Table 11-17/G.993.2 |
| LOSS-L counter | Count of 1-second intervals with one or more LOS defects | 7.2.1.1-2, 7.2.6 | Table 11-17/G.993.2 |
| UAS-L counter | Count of 1-second intervals for which line is unavailable (triggered by 10 contiguous SES-L) | 7.2.1.1-2, 7.2.6 | Table 11-17/G.993.2 |
| VTU-R line performance monitoring | | | |
| FECS-LFE counter | Count of 1-second intervals with one or more FEC anomalies | 7.2.1.1-2, 7.2.6 | Table 11-17/G.993.2 |
| ES-LFE counter | Count of 1-second intervals with one or more CRC-8 anomalies, or one or more LOS/SEF/LPR defects | 7.2.1.1-2, 7.2.6 | Table 11-17/G.993.2 |
| SES-LFE counter | Count of 1-second intervals with more than 18 CRC-8 anomalies, or one or more LOS/SEF/LPR defects | 7.2.1.1-2, 7.2.6 | Table 11-17/G.993.2 |
| LOSS-LFE counter | Count of 1-second intervals with one or more LOS defects | 7.2.1.1-2, 7.2.6 | Table 11-17/G.993.2 |
| UAS-LFE counter | Count of 1-second intervals for which line is unavailable (triggered by 10 contiguous SES-L) | 7.2.1.1-2, 7.2.6 | Table 11-17/G.993.2 |
| VTU-O channel performance monitoring | | | |
| CV-C counter | Count of CRC-8 anomalies in the bearer channel | 7.2.2.1-2, 7.2.6 | Table 11-17/G.993.2 |
| FEC-C counter | Count of FEC anomalies in | 7.2.2.1-2, 7.2.6 | Table 11-17/G.993.2 |

DSL PERFORMANCE MONITORING PARAMETERS

FIG. 7

|  |  | INP_min | | | | | | |
|---|---|---|---|---|---|---|---|---|
|  |  | 0 | ½ | 1 | 2 | 4 | 8 | 16 |
| delay_max [ms] | 1(*) | 14656 | 0 | 0 | 0 | 0 | 0 | 0 |
|  | 2 | 14656 | 7104 | 3008 | 960 | 0 | 0 | 0 |
|  | 4 | 14656 | 13632 | 7104 | 3008 | 960 | 0 | 0 |
|  | 8 | 14656 | 13632 | 13632 | 7104 | 3008 | 960 | 0 |
|  | 16 | 14656 | 13632 | 13632 | 7552 | 3520 | 1472 | 448 |
|  | 32 | 14656 | 13632 | 13632 | 7552 | 3712 | 1728 | 704 |
|  | 63 | 14656 | 13632 | 13632 | 7552 | 3712 | 1728 | 704 |

(*) In G.997.1, a 1 ms delay is reserved to mean that $S_p$ ? 1 and $D_p$= 1.

INP_MIN AND DELAY_MAX RELATIONS WITH DOWNSTREAM NET DATA RATE IN KBPS FOR ADSL2

|  |  | INP_min | | | | | | |
|---|---|---|---|---|---|---|---|---|
|  |  | 0 | ½ | 1 | 2 | 4 | 8 | 16 |
| delay_max [ms] | 1 (*) | 3520 | 0 | 0 | 0 | 0 | 0 | 0 |
|  | 2 | 3520 | 3072 | 1472 | 448 | 0 | 0 | 0 |
|  | 4 | 3520 | 3264 | 1728 | 704 | 192 | 0 | 0 |
|  | 8 | 3520 | 3264 | 1792 | 832 | 320 | 64 | 0 |
|  | 16 | 3520 | 3264 | 1792 | 832 | 384 | 128 | 0 |
|  | 32 | 3520 | 3264 | 1792 | 832 | 384 | 128 | 0 |
|  | 63 | 3520 | 3264 | 1792 | 832 | 384 | 128 | 0 |

(*) In G.997.1, a 1 ms delay is reserved to mean that $S_p$ ? 1 and $D_p$= 1.

INP_MIN AND DELAY_MAX RELATIONS WITH UPSTREAM NET DATA RATE IN KBPS FOR ADSL2

FIG. 8

|  | | INP_min | | | | | |
|---|---|---|---|---|---|---|---|
|  | | 0 | ½ | 1 | 2 | 4 | 8 | 16 |
| delay_max [ms] | 1 (*) | 24432 | 0 | 0 | 0 | 0 | 0 | 0 |
| | 2 | 24432 | 7104 | 3008 | 960 | 0 | 0 | 0 |
| | 4 | 24432 | 15232 | 7104 | 3008 | 960 | 0 | 0 |
| | 8 | 24432 | 22896 | 15232 | 7104 | 3008 | 960 | 0 |
| | 16 | 24432 | 22896 | 15232 | 7552 | 3520 | 1472 | 448 |
| | 32 | 24432 | 22896 | 15232 | 7552 | 3712 | 1728 | 704 |
| | 63 | 24432 | 22896 | 15232 | 7552 | 3712 | 1728 | 704 |

(*) In G.997.1, a 1 ms delay is reserved to mean that $S_p$ ? 1 and $D_p$ = 1.

INP_MIN AND DELAY_MAX RELATIONS WITH UPSTREAM NET DATA RATE IN KBPS FOR ADSL2+

|  | | INP_min | | | | | |
|---|---|---|---|---|---|---|---|
|  | | 0 | ½ | 1 | 2 | 4 | 8 | 16 |
| delay_max [ms] | 1 (*) | 3520 | 0 | 0 | 0 | 0 | 0 | 0 |
| | 2 | 3520 | 3072 | 1472 | 448 | 0 | 0 | 0 |
| | 4 | 3520 | 3264 | 1728 | 704 | 192 | 0 | 0 |
| | 8 | 3520 | 3264 | 1792 | 832 | 320 | 64 | 0 |
| | 16 | 3520 | 3264 | 1792 | 832 | 384 | 128 | 0 |
| | 32 | 3520 | 3264 | 1792 | 832 | 384 | 128 | 0 |
| | 63 | 3520 | 3264 | 1792 | 832 | 384 | 128 | 0 |

(*) In G.997.1, a 1 ms delay is reserved to mean that $S_p$ ? 1 and $D_p$ = 1.

INP_MIN AND DELAY_MAX RELATIONS WITH UPSTREAM NET DATA RATE IN KBPS FOR ADSL2

FIG. 9

VIDEO STREAMING DIAGNOSTICS

CLAIM FOR PRIORITY

This application is a continuation of previously filed and copending U.S. patent application Ser. No. 12/226,911, entitled "VIDEO STREAMING DIAGNOSTICS," naming as inventors Seong Taek Chung, Georgios Ginis, Peter J. Silverman, Philip Bednarz, Raghvendra Savoor, and Zhi Li, and filed on Mar. 17, 2010, which is the 371 National Phase of Patent Application No. PCT/US2007/067720 entitled, "VIDEO STREAMING DIAGNOSTICS," naming as inventors Seong Taek Chung, Georgios Ginis, Peter J. Silverman, Philip Bednarz, Raghvendra Savoor, and Zhi Li, and filed on Apr. 27, 2007, which claims the benefit of U.S. Provisional Patent Application No. 60/796,371, entitled, "DSL SYSTEM," and filed on May 1, 2006, all applications of which are hereby incorporated herein by reference in their entireties.

FIELD OF THE DISCLOSURE

This disclosure relates generally to communications networks, systems or any combination thereof and, more particularly, to methods and apparatus for video streaming diagnostics.

BACKGROUND

IPTV (Internet Protocol Television) is a technology for broadcasting television signals using the Internet Protocol over consumer broadband connections such as digital subscriber line (DSL) lines. IPTV refers to both live TV (multicasting) as well as stored video (Video on Demand VOD). Fundamentally, the DSL physical layer for IPTV is the same as the one for providing high-speed Internet. In practice, the required performance objectives are significantly different between IPTV and high-speed Internet. Therefore, DSL diagnostic tools designed for a high-speed Internet service may not be adequate for an IPTV service. For example, a small number of errors in the physical layer may not be noticed by the web-surfer, but may result in unsatisfactory experience for the IPTV viewer. In contrast, when errors occur while web-surfing, the lost packets can in most cases be received through retransmission without the customer perceiving the errors. However, for IPTV, once an uncorrectable error occurs, the customer will immediately notice it.

Content providers using video streaming, such as IPTV providers, maintain their applications independent from the DSL service provider. As a result, the DSL service provider typically does not diagnose problems above the physical layer. In contrast, content providers maintain their own applications and typically do not diagnose problems at the physical layer. The physical layer is one of the seven abstract layers defined in the Open Systems Interconnection Basic Reference Model (OSI). The seven layers are commonly known as the physical, link, network, transport, session, presentation and application layers. However, video streaming errors may arise from more than one of the seven layers. Previous solutions to this problem either ignore the availability of data from more than one layer, which can often lead to unreliable IPTV service.

BRIEF DESCRIPTION OF THE DRAWINGS

FIG. 6 illustrates tables for minimum and maximum delays according to one embodiment;

FIG. 7 is a table of DSL error metrics available for VDSL2 according to one embodiment;

FIG. 8 illustrate tables for minimum and maximum delays according to one embodiment;

DETAILED DESCRIPTION

Figure 1:
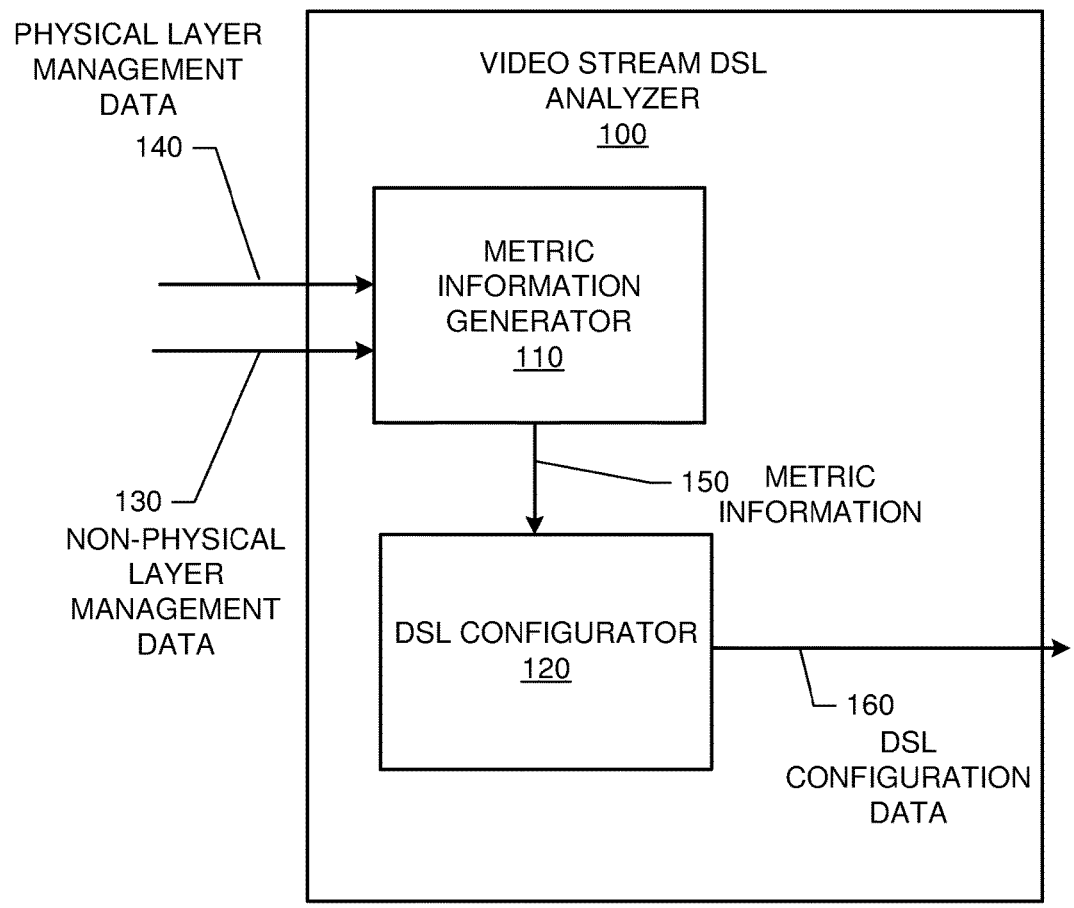
FIG. 1 is a block diagram of a video stream analyzer according to one embodiment.

A video stream DSL analyzer receives at least non-physical layer management data and physical layer management data and in response generates metric information. The generated metric information is used to characterize the performance of the video stream information or diagnose any problems if necessary. In response to the metric information, the video stream DSL analyzer changes one or more DSL configuration(s) in order to improve performance. For example, the video streaming protocol may conform to the Open Systems Interconnection Basic Reference Model (OSI). The video stream DSL analyzer performs DSL diagnosis on multiple layers. Diagnosis is performed in response to both physical and non-physical layer management data (i.e. link, network, transport, session, presentation and application layers). Management data refers to any data suitable to monitor, diagnose or control the performance of one or more elements of the DSL network. According to one embodiment, the physical and application layers are diagnosed; however any combination of physical and non-physical layers may be diagnosed. According to another embodiment, the video stream DSL analyzer performs DSL diagnosis on any two of the seven possible layers. Therefore, data from any combination of two layers from the seven layers may be used to produce the metric information.

The video stream DSL analyzer diagnoses performance issues and problems on multiple layers and is operable to optimize parameters on the corresponding multiple layers. The video stream DSL analyzer is one of several DSL diagnostic tools to support video streaming on a high-speed Internet service. These diagnostic tools ensure that the video streaming service provides video quality according to any suitable performance requirements. For example, the diagnostic tools ensure that the video streaming service provides video quality as stable as or more stable than existing broadcast, satellite or cable TV services. The video stream DSL analyzer also allows the service provider to guarantee a certain data rate on the DSL line, in order to deliver video streaming service.

As used herein, the term "DSL" refers to any of a variety or variant of DSL technology such as, for example, Asymmetric DSL (ADSL), High-speed DSL (HDSL), Symmetric DSL (SDSL), or Very high-speed DSL (VDSL1 and VDSL2). Such DSL technologies are commonly implemented in accordance with an applicable standard such as, for example, the International Telecommunications Union (ITU) standard G.992.1 (a.k.a. G.dmt) for ADSL modems, the International Telecommunications Union (ITU) standard G.992.3 (a.k.a. G.dmt.bis) for ADSL2 modems, the International Telecommunications Union (ITU) standard G.992.5 (a.k.a. G.adsl2plus) for ADSL2+ modems, the International Telecommunications Union (ITU) standard G.993.1 (a.k.a. G.vdsl) for VDSL modems, the International Telecommunications Union (ITU) standard G.993.2 for VDSL2 modems, the International Telecommunications Union (ITU) standard G.994.1 (G.hs) for modems implementing handshake, the ITU G.997.1 (a.k.a. G.ploam) standard for management of DSL modems, or any suitable combination.

As used herein, the term "operative" describes an apparatus capable of an operation or actually in operation, or any combination thereof. For example, an apparatus turned off or powered off is "operative" to perform or capable of performing an operation when the apparatus is turned on. Thus, although an apparatus is powered off or otherwise turned off, the apparatus is "operative" to perform some function by virtue of pre-programmed hardware or software programmed hardware or any combination thereof. The term "signal" typically refers to an analog signal, the term "data" typically refers to digital data and the term "information" may refer to either an analog signal or a digital signal although other meanings may be inferred from the context of the usage of these terms.

FIG. 1 is a block diagram of a video stream DSL analyzer 100 according to one embodiment. The video stream DSL analyzer 100 includes a metric information generator 110 coupled to a DSL configurator 120. According to one embodiment, the video stream DSL analyzer 100 may be part of a computer server, such as a network management system server, or other suitable computer. The video stream DSL analyzer 100 may also be one or more suitably programmed processors, such as a microprocessor, and therefore includes associated memory containing executable instruction that when executed cause the video stream DSL analyzer 100 to carry out the operations described herein.

Figure 2:
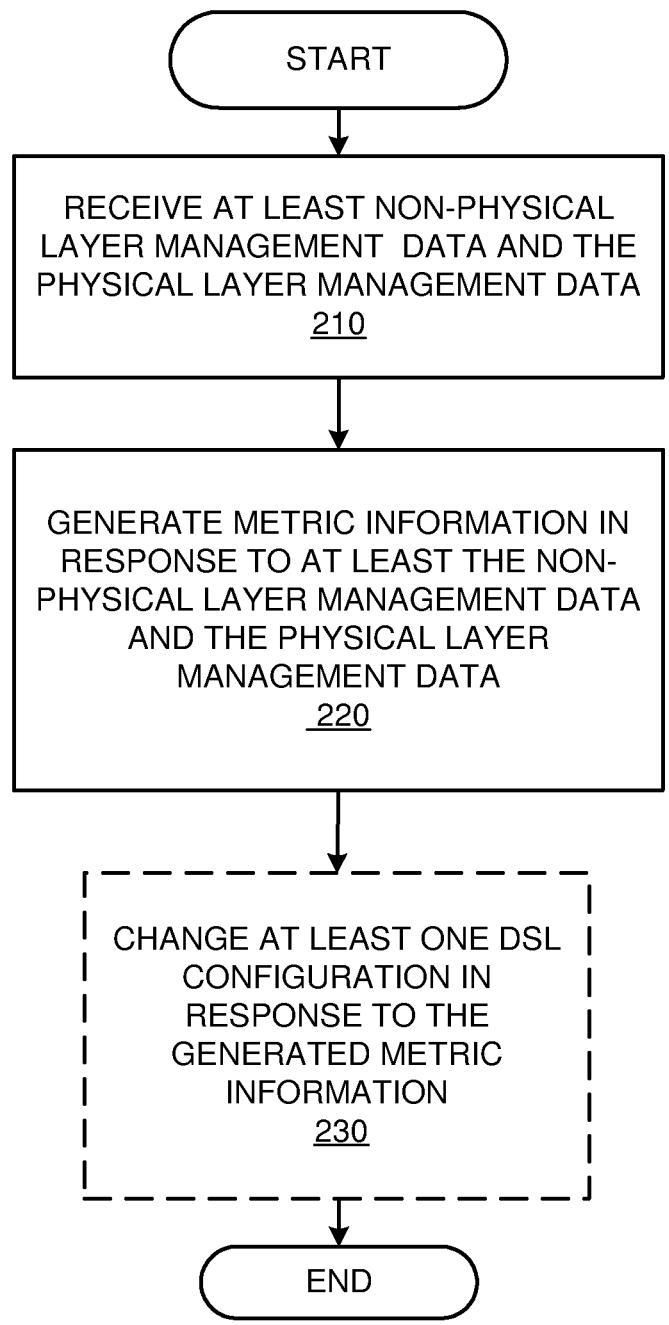
FIG. 2 is a flowchart of a method to diagnose a video stream over a DSL network according to one embodiment.

FIG. 2 is a flowchart of a method to diagnose a video stream over a DSL network according to one embodiment. The method may be carried out by the video stream DSL analyzer 100 shown in FIG. 1. However, any other suitable structure may also be used. It will be recognized that the method beginning with step 210 will be described as a series of operations, but the operations may be performed in any suitable order and may be repeated in any suitable combination.

As shown in block 210 of FIG. 2 and in the block diagram of FIG. 1, the metric information generator 110 receives at least non-physical layer management data 130 and physical layer management data 140. The physical layer management data 140 may correspond to information related to the physical layer of the OSI model. The non-physical layer management data 130 may correspond to data related to any corresponding non-physical OSI layer, such as the link, network, transport, session, presentation and application layers. According to one embodiment, the non-physical layer management data 130 includes any combination of: subscriber bandwidth usage, MPEG error data, packets received, bytes received, packets lost, fraction lost, corrupted packets, overruns, underruns, receive interarrival jitter, average receive interarrival, packets received, packet discontinuity counter or any other suitable data. For example, the DSL Forum entitled "Data Model for a TR-069 enabled STB, WT-135 revision 3, February 2006" defines a data model for monitoring and controlling the set top box (STB). According to one embodiment, the non-physical layer management data 130 described above are listed as parameters related to IPTV services in this data model; however data from any suitable video streaming service may be used. For example, these parameters may be used for diagnosing video streaming issues such as IPTV delivery issues.

According to one embodiment, the physical layer management data 140 is any combination of: reported INP, reported delay, reported data rate, full inits counter, failed full inits counter, short inits counter, failed short inits counter, FECS-L counter, ES-L counter, SES-L counter, LOSS-L counter, UAS-L counter, FECS-LFE counter, ES-LFE counter, SES-LFE counter, LOSS-LFE counter, UAS-LFE counter, CV-C counter, FEC-C counter, CV-CFE counter, FEC-CFE counter, CRC-P counter, CRCP-P counter, CV-P counter, CVP-P counter CRC-PFE counter, CRCP-PFE counter, CV-PFE counter, CVP-PFE counter or any other suitable data.

The non-physical layer corresponds with at least one of: an Ethernet, IP, UDP, RTP, MPEG-TS, MPEG Payload, data, link, network, transport, session, presentation, and application layer. According to an alternative embodiment, the video stream and the corresponding non-physical layer management data 130 and physical layer management data 140 may conform to all or part of the Open Systems Interconnection Basic Reference Model (OSI). According to one embodiment, the metric information generator 110 receives information from any two of the seven possible OSI abstraction layers. Thus, the received management data 130, 140 is not limited to physical layer management data but may include any valid combination of layers with any two of the seven layers for any suitable video streaming protocol.

The table below illustrates physical layer management data 140, according to one embodiment, as DSL initialization metrics available for VDSL2. The table lists example DSL initialization metrics as physical layer management data 140, however any other metrics or similar DSL error metrics may be used as well. According to one embodiment, the physical layer management data 140 allows the video stream DSL analyzer 100 to estimate the reliability of the physical layer for delivering video streaming.

For example, the element management system (EMS), auto-config server (ACS) or any combination thereof may provide DSL error metrics to the video stream DSL analyzer 100 to derive network error metrics as described in more detail below. These DSL initialization metrics may be reported in intervals of, for example, every 5, 10, 15 minutes, or any interval and also for the current and previous 1 day interval, or for any suitable intervals. An initialization history showing a large count of initialization attempts may be an indication of time-varying stationary noise.

| Parameter | Description | G.997.1 references | PHY references |
|---|---|---|---|
| Full inits counter | Count of full initialization attempts on the line during the accumulation period | 7.2.1.3 | — |
| Failed full inits counter | Count of failed full initialization attempts on the line during the accumulation period | 7.2.1.3 | — |
| Short inits counter | Count of short initialization attempts on the line during the accumulation period | 7.2.1.3 | Short initialization not yet defined in VDSL2 |
| Failed short inits counter | Count of failed short initialization attempts on the line during the accumulation period | 7.2.1.3 | Short initialization not yet defined in VDSL2 |

As shown in block 220 of FIG. 2 and in the block diagram of FIG. 1, the metric information generator 110 generates metric information 150 in response to the non-physical layer management data 130 and physical layer management data 140. For example, the non-physical layer management data 130 and physical layer management data 140 obtained from the multiple sources can be correlated or combined to diagnose and determine the root cause of any video stream degradation.

An example for calculating the metric information 150 is provided. However, any alternative techniques for calculating the metric information 150 may be used. According to one embodiment, the video stream DSL analyzer 100 may directly set the metric information 150 to at least one of the received management data 130, 140. For example, the video stream DSL analyzer 100 may directly set the metric information 150 to a packet loss, delay, error rate or any suitable performance metric received. According to an alternative embodiment, the video stream DSL analyzer 100 groups the received management data 130, 140 for a corresponding timeslot or otherwise synchronizes or translates the received management data 130, 140. According to yet another embodiment, the video stream DSL analyzer 100 computes or generates the metric information 150 as a function of at least two of the received management data 130, 140. The function may be an average, a Bayesian computation as described in a co-pending application entitled "METHODS AND APPARATUS TO COMBINE DATA FROM MULTIPLE SOURCES TO CHARACTERIZE COMMUNICATION SYSTEMS", owned by the instant assignee and having the same filing date as the instant application herein incorporated by reference or any suitable function. Further yet, the video stream DSL analyzer 100 computes or generates the metric information 150 using any combination of the embodiments described herein, or any other suitable functions or combinations.

According to yet another embodiment, the metric information 150 may be a packet loss rate. Again, the metric information 150 may be any suitable metric combination or parameter such as delay, bandwidth usage, packet discontinuity, packet size or any suitable performance metric. For example, the packet loss rate can be derived from the code violation counts (CV-C and CV-CFE). The code violation count derivations differ for VDSL1 and VDSL2, because the definitions of code violations differ between these standards. Although examples of calculating packet loss rate are provided below, the techniques as well as the data used as a basis for the calculations may be different depending on, for example, the performance characteristic desired, the available data and the specific protocol or OSI layer involved.

In VDSL1, the CV-C and CV-CFE counters can capture the number of VDSL1 superframes that contain at least one DSL error. Any other suitable metric, data, counter or information may be used as physical layer management data 140. For example, let the total number of Ethernet frames within a 15-min period (any suitable period may be used) equal to:

$$\frac{Ethernet\_frames}{DMT\_superframes} \times 360 \cdot 10^3 \text{ Ethernet frames}$$

In an exemplary low error rate scenario, one CRC error will mean that only one Ethernet frame is corrupted per DMT superframe. In an exemplary high error rate scenario, each CRC error will mean that all Ethernet frames spanning a DMT superframe are corrupted. It is here assumed that the net data rate is in the range of VDSL applications, so that the number of Ethernet frames per DMT superframe is larger than 1. (This corresponds to net data rates larger than 4.3648 Mbps.) If this does not hold, then two CRC errors might lead to only one Ethernet frame error.

Assuming the exemplary low error rate scenario, the ratio of corrupted Ethernet frames to the total Ethernet frames within a 15-minute interval is approximately equal to:

$$Ethernet\_Frame\_Loss\_Rate\_low = \frac{CV}{360 \cdot 10^3} \cdot \frac{DMT\_superframes}{Ethernet\_frames}$$

Assuming the exemplary high error rate scenario, the ratio of corrupted Ethernet frames to the total Ethernet frames within a 15-minute interval is approximately equal to:

$$Ethernet\_Frame\_Loss\_Rate\_high = \frac{CV}{360 \cdot 10^3}$$

The above estimates of Ethernet Frame Loss Rate can subsequently be translated into loss rates for packet types of higher layers. For example, by knowing that 7 MPEG-TS packets are typically contained within an Ethernet frame, one can compute the MPEG-TS loss rate. In this manner, one can convert DSL error metrics to the upper layer frame error rate, and eventually to the video frame error rate.

In VDSL2, the framing method is completely different than VDSL1, which has many implications on the interpretation of the CV count. There are two latency paths, and thus two framing operations. The elementary framing unit is the Mux Data Frame (MDF), which consists of bytes from the overhead buffer, the buffer of bearer channel 0, and the buffer of bearer channel 1. By combining Mp MDFs, the payload of a RS codeword is formed, and the parity bytes are added. By combining Tp/Mp RS codewords, a "group of codewords" is formed. By combining Up "groups of codewords", a "super-group of codewords" is formed. The total number of bytes in such a "super-group" is (Up×Tp/Mp) times the number of bytes per RS codeword and is defined as PERBp.

Each MDF has a number of overhead bytes. The overhead bytes contained in the MDFs of Tp/Mp RS codewords form an OH sub-frame. The combination of Up OH sub-frames (one for each "group of codewords") gives an OH frame. The format of an OH frame can be seen to contain a CRC byte. This CRC byte is computed based on the PERBp bytes of a "super-group" of RS codewords.

The "message" over which the CRC byte is computed has variable length, which is expressed as shown below.

$PERB_p$    The number of bytes in the overhead frame:

$$PERB_p = \frac{T_p \times N_{FEC_p}}{M_p} \times \left\lceil \frac{\hat{Q} \times M_p}{T_p \times N_{FEC_p}} \right\rceil \text{ bytes}$$

where $$\hat{Q} = \begin{cases} Q & \text{if } TDR_p \geq TDR_0 \\ Q \cdot \frac{TDR_p}{TDR_0} & \text{if } TDR_p < TDR_0 \end{cases},$$

and where $TDR_p$ is the total data rate of latency path p in kbit/s,
   $Q = 17000$ bytes,
   $TDR_0 = 7880$ kbit/s.

$PER_p$    The duration of the overhead frame in ms (see NOTE):

$$PER_p = \frac{T_p \times S_p \times U_p}{f_s \times M_p} = \frac{8 \times PERB_p}{L_p \times f_s} \text{ ms.}$$

Thus, a CV count means that there is an error within a "data block" equal to PERBp bytes. This data block includes overhead bytes and RS parity bytes. It can be seen that for practical total data rates, PERBp is lower-bounded by 17,000 bytes. Calculating the exact duration of this "data block" requires knowledge of parameters (Tp, Mp and Up). If this data is not available, then assuming knowledge of such a duration period, then the Ethernet frame loss rate calculations would use similar derivations as for VDSL1.

As shown in optional bock 230, the DSL configurator 120 receives the generated metric information 150 and in response is operative to change at least one DSL configuration, according to one embodiment. The DSL configurator 120 produces DSL configuration data 160 to characterize the performance of the video stream, correct problem(s) or any combination thereof. According to one embodiment, in response to the DSL configuration data 160, the video stream DSL analyzer 100 changes one or more DSL configuration(s) in order to improve performance. The video stream DSL analyzer 100 performs DSL diagnosis on any two of the seven layers. For example, diagnosis is performed in response to both the physical layer management data 140 and the non-physical layer management data 130 (i.e. link, network, transport, session, presentation and application layers). According to one embodiment, the physical and applications layers are diagnosed; however any combination of physical and non-physical layers may be diagnosed.

Figure 3:
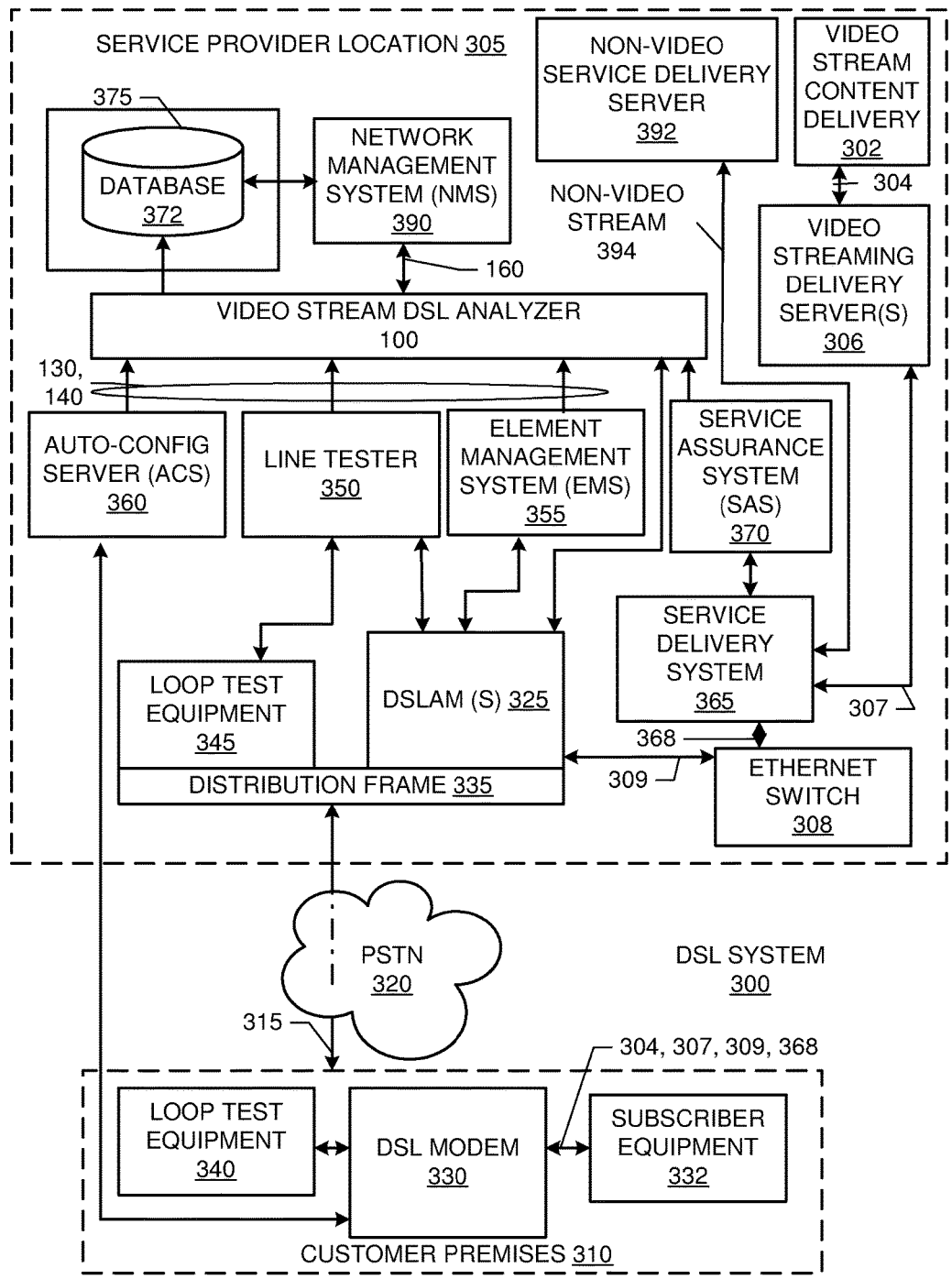
FIG. 3 is a block diagram of a DSL system according to one embodiment.

FIG. 3 is a block diagram of a DSL system 300 according to one embodiment. The DSL system 300 includes equipment at a service provider location 305 coupled to a customer premises 310 via PSTN 320. In the illustrated example, the DSL services are, or may be, provided to the example customer premises 310 via a conventional twisted-pair copper telephone line 315. The example telephone line 315 of FIG. 3 is a part of a public switched telephone network (PSTN) 320. The service provider location 305 includes video stream content delivery 302, video streaming delivery servers 306, Ethernet switch 308 and non-video service delivery server 392. The video stream content delivery 302 may be for example, a television station, a provider of video stream content or any other suitable video stream content provider to produce a video stream 304.

The video streaming delivery server(s) 306 receives a video stream 304 and in response formats the video stream 304, for example according to the Internet Protocol (IP), and provides a delivered video stream 307 to the service delivery system 365. Similarly, the non-video service delivery server 392 receives non-video content from, for example, an Internet service provider (ISP) or any suitable server, formats the non-video content according to the Internet Protocol and produces non-video stream 394. The service delivery system 365 receives at least the non-video stream 394 and the delivered video stream 307 and in response produces Internet data 368. The Ethernet switch 308 receives the Internet data 368 and transmits routed or switched Internet data 309 for transmission ultimately to the appropriate subscriber equipment 332.

The customer premises 310 include for example a DSL modem 330 connected to subscriber equipment 332 and loop test equipment 340. The term "customer premises" refers to the location to which communication services are being provided by a service provider. For an example public switched telephone network (PSTN) used to provide DSL services, customer premises are located at the network termination (NT) side of the telephone lines. As used herein, the terms "user", "subscriber" or "customer" refer to a person, business or organization to which communication services or equipment are or may potentially be provided by any of a variety of service provider(s). Example subscriber equipment 332 includes a personal computer (PC), a set-top box (STB), a residential gateway or a television located at a subscriber's residence by which the subscriber receives or utilizes a DSL service or Internet services.

The service provider location 305 includes DSLAM(s) 325, a distribution frame 335 that implements a metallic cross-connect, loop test equipment 345 and line tester 350. According to one embodiment, the example loop test equipment 345 may be implemented by or within the DSLAM 325 or any suitable component. The term "service provider location" refers to a location from which DSL services are provided or a location in which systems or equipment related to the providing of DSL services are located. Example service providers include a telephone operating company, a cable operating company, a wireless operating company, or an Internet service provider to provide, sell, provision, troubleshoot or maintain communication services or communication equipment. The example DSLAM(s) 325 implements, among other things, any of a variety or number of DSL modem(s), one of which is, or may be, used to provide DSL service to the example customer premises 310 via the telephone line 315. The service provider location 305 also includes an auto-configuration server (ACS) 360, element management system (EMS) 355, service assurance system (SAS) 370, service delivery system 365, data collector combiner (not shown) and network management system (NMS) 390. FIG. 3 shows these elements according to one embodiment, however these elements can be reallocated in any desired manner.

Any combination of the loop test equipment 340 or line tester 350 measure, compute or otherwise determine any number or any of a variety of signals, management data 130, 140, information or parameter(s) that characterize, describe or indicate a status of the telephone line 315. In the illustrated example of FIG. 3, the example loop test equipment 345 is connected to the telephone line 315 via the distribution frame 335, and the example loop test equipment 340 is connected to the telephone wiring located in the customer premises 310 (i.e., an in-home distribution network). Additionally or alternatively, the example loop test equipment 345 may be implemented by or within the DSLAM 325 or any suitable component.

EMS 355 monitors, measures or records physical layer management data 140 such as current or historical DSL performance characteristics for DSL communications occurring between the example DSLAM 325 and the DSL modem 330. Physical layer management data 140 such as DSL performance data, statistics or information for ongoing DSL services can be measured or reported to the EMS 355 by the example DSL modem 330 or the DSLAM 325 using any of a variety of well known techniques. For example, they can be measured based on the ITU G.992.1 (a.k.a. G.dmt) standard or based on the ITU G.997.1 (a.k.a. G.ploam) standard for management of DSL modems. Example performance data, statistics and information include, but are not limited to any combination of: EMS data, EMS status, HLOG, HLIN, QLN (quiet line noise), SNR, LATN (line attenuation), SATN (signal attenuation), noise, channel attenuation, data rate, ATTNDR (attainable data rate), margin, CV (code violations), FEC (forward-error-correction) counts, ES (errored seconds), SES (severely errored seconds), UAS (unavailable seconds), BITS (bit distribution), GAINS (fine gains), TSS1 (transmit spectral shaping), MREFPSD (reference PSD), transmitted power, transmitted PSD, failures, initialization counts, actual delay, actual impulse noise protection, forward error correction (FEC) and interleaving data, impulse noise sensor data, a number of FEC errors, margin information, data rate information, a channel transfer function, loop attenuation information, bit allocation information, or any other suitable performance information.

Physical layer management data 140 includes performance information related to DSL physical layer characteristics, or DSL-PHY-characterizing data including SNR, bit distribution, data rate, margin, attainable data rate, or any suitable information. In the example of FIG. 3, physical layer management data 140 such as DSL performance data, statistics or information is sent by the example DSL modem 330 via the DSL service using, for example, the exchange protocol defined in the ITU G.994.1 (a.k.a. G.hs) standard. Additionally or alternatively, the DSL performance data, statistics or information may be sent by the DSL modem 330 via a transmission control protocol (TCP)/Internet protocol (IP) connection to the ACS 360 as defined in the DSL Forum document TR-069.

The service delivery system(s) 365 produces Internet data 368 to provide any of a variety of services such as, for example, video streaming, IP television (IPTV), video-on-demand (VoD), voice-over-IP (VoIP) or any combination thereof of service to the example customer premises 310. SAS 370 monitors the quality, performance or characteristics of services provided by the example service delivery system 365. For example, the service delivery systems 365 combine and format the Internet data 394 and the delivered video stream 307 for distribution according to the Internet Protocol to the appropriate subscriber equipment. For example, the SAS 370 monitors, for example, motion picture experts group (MPEG) statistics (e.g., frame losses, etc.), a packet loss rate, etc. of the video stream 304.

As described above, the example ACS 360, the example line tester 350, the example EMS 355, the example SAS 370, or any combination thereof represent sources of data indicative of past, ongoing or possible future DSL services provided or provide-able by the service delivery system 365, the DSLAM 325 or the DSL modem 330 via the telephone line 315. As described above, the example data sources 350, 355, 360, 370 may contain data measured, collected, estimated, determined, or any combination thereof at either one of or both ends of the example telephone line 315. The example data sources 350, 355, 360, 370 of FIG. 3 may collect and report data on a periodic or aperiodic basis. Additionally or alternatively, data may be collected and reported in response to a request for data or information. Data or information collected by the data sources 350, 355, 360, 370 may represent current or past snapshot(s) of the example DSL system of FIG. 3.

Note that data formats used by the different data collection sources may differ substantially. For example, the EMS 355 may report physical layer management data 140 such as 15-min DSL error counters, the ACS 360 may report DSL errors since Showtime, and the Service Assurance Server 370 may report MPEG frame statistics. Accordingly, methods to "translate" from one type to another type vary widely depending on many factors and may be applied. Further, the data collected from multiple sources may not be synchronized, and steps must be taken to make sure that data comparisons are made for the appropriate time periods.

Management data 130, 140 or information collected, acquired, measured, computed, estimated, received, or any combination thereof by the example data sources 350, 355, 360, 370 may be affected by any of a variety of factors such as, relevance, completeness, reliability, accuracy and timeliness (e.g., recent versus out of date). Some of the example data sources 350, 355, 360, 370 have inherently higher accuracy or reliability and, thus, may be more useful in the determination of particular parameters related to the example DSL system of FIG. 3. For example, TDR data contained in the example line tester 350 may be more accurate or more useful for detecting or parameterization of a bridged tap than channel attenuation data or a channel transfer function available in the EMS 355.

In the illustrated example, two of the data sources 350, 355, 360, 370 may include related, similar or possibly incomplete management data 130, 140. For example, (a) the example ACS 360 may contain ACS type management data 130, 140 that represents the channel attenuation for a first portion of frequencies (e.g., the downstream channel), while the EMS 355 contains EMS type management data 130, 140 that represents the channel attenuation for a second portion of frequencies (e.g., the upstream channel) or (b) a bridged tap can be detected using related information from a channel transfer function contained in the ACS 360 or a TDR response contained in the line tester 350. Further, while the ACS 360 and the EMS 355 may both contain channel attenuation type management data 130, 140, they may obtain or store the management data 130, 140 with a different accuracy or representation. Examples of ACS type management data 130, 140 also include any combination of: ACS status, HLOG, HUN, QLN (quiet line noise), SNR, LATH (line attenuation), SATN (signal attenuation), noise, channel attenuation, data rate, ATTNDR (attainable data rate), margin, CV (code violations), FEC (forward-error-correction) counts, ES (errored seconds), SES (severely errored seconds), UAS (unavailable seconds), BITS (bit distribution), GAINS (fine gains), TSSI (transmit spectral shaping), MREFPSD (reference PSD), transmitted power, transmitted PSD, failures, initialization counts, actual delay, actual impulse noise protection, FEC and interleaving data, impulse noise sensor data or other suitable data. HLOG can be reported from the EMS 355 ACS 360 or any suitable network element depending on for example the particular equipment and relevant DSL standard; wherever it might be located. HLOG is another example of physical layer management data 140. Management data 130, 140 from DSLAM 325 can be collected via EMS 355 and management data 130, 140 from the DSL modem 330 can be collected via ACS 360. Other examples will abound to persons of ordinary skill in the art.

Using any of a variety of method(s), protocol(s), communication path(s) or communication technology(ies), the example line tester 350 of FIG. 3 can configure, command or request that the example loop test equipment 340 or 345 transmit any of a variety of line probing signals into the telephone line 315, or receive or measure signals present on the telephone line 315 with or without injecting a line probing signal. Any combination of signal probing, signal receiving, or measuring can be utilized by the example line tester 350, or the loop test equipment 340, 345 to perform any of a variety of single-ended or double-end line testing method(s), algorithm(s) or technique(s).

Example probing signals include any combination of: step time domain reflectometry (TDR) signals, pulse TDR signals, spread spectrum signals, nominal modem transmission signals (e.g., a multi-carrier training signal for an ADSL modem), chirp signals, impulse trains, single impulse, or any suitable signals. Example methods and apparatus to transmit line probing signals or receive or measure signal(s) present on the telephone line 315 are described in U.S. Provisional Patent Application No. 60/796,371, filed on May 1, 2006, and U.S. patent application Ser. No. 12/226,911, filed on Mar. 17, 2010, which applications are incorporated by reference.

While the following disclosure references the example digital subscriber line (DSL) system 300 or the example devices of FIG. 3, the methods and apparatus described herein may be used to estimate, determine or infer metric information 150 including characteristics or parameters for telephone lines 315 or DSL equipment for any variety, any size or any topology of DSL system 300 or network. For example, the DSL system 300 may include any number of customer premises, more than one DSL access multiplexer DSLAM(s) 325 located in more than one location, or may include any number and combination of telephone lines, DSL modems, servers, systems, data sources, data collectors, data stores, data combiners or data collector combiners.

Although the following disclosure is made with respect to example digital subscriber line (DSL) equipment, DSL services, DSL systems or the use of ordinary twisted-pair copper telephone lines for distribution of DSL services, it should be understood that the disclosed methods and apparatus to infer characteristics of communication systems or networks using data collected from multiple data sources disclosed herein are applicable to many other types or varieties of communication equipment, services, technologies or systems.

For example, the disclosed methods and apparatus may also be applicable to wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, WiMAX, WiFi, fiber optic networks or any suitable network or system. Additionally, combinations of these devices, systems or networks may also be used. For example, a combination of twisted-pair and coaxial cable connected by a balun, or any other physical-channel-continuing combination such as an analog fiber to copper connection with linear optical-to-electrical connection at an optical network unit (ONU) may be used.

Alternatively or additionally, a computing device communicatively coupled or couple-able to the loop test equipment 340, 345 may generate the metric information 150. For example, the example line tester 350 may obtain the received or measured signals from the loop test equipment 340, 345 and estimate or determine the metric information 150. Alternatively or additionally, subscriber equipment (e.g., a subscriber's personal computer (PC) or set-top box (STB)) may be used to estimate or determine the metric information 150.

According to one embodiment as shown in the illustrated example of FIG. 3, the video stream DSL analyzer 100 receives non-physical layer management data 130 and physical layer management data 140 from the example loop tester 340, 345, the example line tester 350, DSLAM(s) 325, ACS 360, EMS 355, SAS 370 or any suitable device via any of a variety of method(s), network(s), protocol(s), or any combination thereof. Any other device or system used to receive, measure, compute or estimate metric information 150 may, such as video streaming delivery servers 306, Ethernet switch 308 and subscriber equipment 332 additionally or alternatively, provide the same to the example line tester 350.

While example data sources 350, 355, 360 and 370 are illustrated in FIG. 3, persons of ordinary skill in the art will readily understand that a DSL system may include additional or alternative data sources than those illustrated in FIG. 3 or may include more than one of any or all of the illustrated data sources. Further, while this disclosure describes particular pieces of data or information being contained or available via particular ones of the example data sources 350, 355, 360, 370 of FIG. 3, persons of ordinary skill in the art will readily recognize that a DSL service provider may utilize any of a variety of combinations of data or information and data sources.

For a DSL system or network containing more than one telephone line, DSLAM 325 or DSL modem 330, the example data sources 350, 355, 360 or 370 of FIG. 3 contain data associated with each telephone line 315, DSLAM 325 or DSL modem 330. However, the set of data contained in the data sources 350, 355, 360 or 370 may differ, for example, from telephone line to telephone line, DSLAM to DSLAM, DSL modem to DSL modem, or subscriber to subscriber, for any of a variety of reasons such as, for example, how long a DSL service has been active, the type or manufacturer of a DSL modem, types of services utilized or subscribed to, location of a customer premises, etc.

Video stream DSL analyzer 100 receives any of a variety of parameter(s), management data 130, 140 or information based on data contained from one or more example data sources 350, 355, 360 or 370, to generate metric information 150 and also to check the integrity of the management data 130, 140, and check the consistency of the management data 130, 140. If management data 130, 140 is collected from more than one of the data sources 350, 355, 360 or 370, the example data video stream DSL analyzer 100 heuristically, logically, statistically or probabilistically combines the checked data 130, 140.

According to one embodiment, the video stream DSL analyzer 100 stores the non-physical layer management data 130, physical layer management data 140, metric information 150 or the DSL configuration data 160 in an example database 372 using any of a variety of data structure(s), data table(s), data array(s), etc. The example database 372 is stored in a machine accessible file or in any of a variety of memory 375.

Network Management System (NMS) 390 controls, monitors, maintains or provisions the example DSL system 300 to allow the video stream DSL analyzer 100 and a person such as a customer service representative, a sales person or a technician to control, monitor, maintain or provision the example DSL system 300. The example NMS 390 uses, provides or makes available to the video stream DSL analyzer 100 or a person the parameter(s), data or information stored in the example database 372. Alternately or additionally, the example NMS 390 of FIG. 3 may directly provide or make available the parameter(s), data or information inferred, estimated, computed or determined by the example video stream DSL analyzer 100. For example, the NMS 390 can provide a GUI by which a technician can retrieve any combination of the non-physical layer management data 130, physical layer management data 140, metric information 150 or the DSL configuration data 160.

Figure 4:
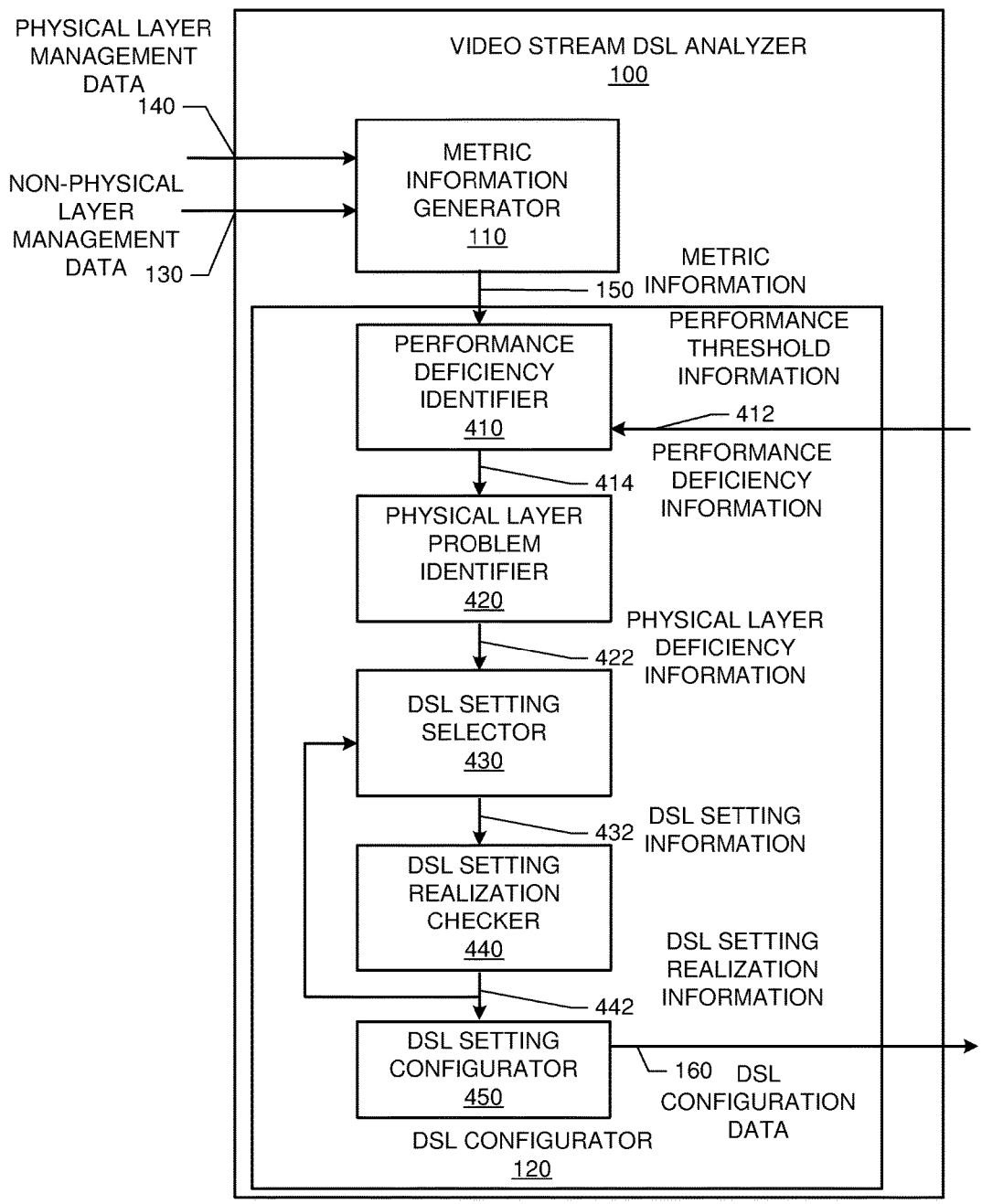
FIG. 4 is a block diagram and manner of implementing the video stream DSL analyzer according to another embodiment.

FIG. 4 is a block diagram of implementing the video stream DSL analyzer 100 according to another embodiment. The DSL configurator 120 further includes a performance deficiency identifier 410, a physical layer problem identifier 420, a DSL setting selector 430, a DSL setting realization checker 440 and a DSL setting configurator 450. The performance deficiency identifier 410 is operatively coupled to the metric information generator 110 and the physical layer problem identifier 420. The DSL setting selector 430 is operatively coupled to the physical layer problem identifier 420 and the DSL setting realization checker 440. The DSL setting configurator 450 is operatively coupled to the DSL setting realization checker 440. According to an alternative embodiment, the DSL setting selector 430 is operatively coupled to the performance deficiency identifier 410.

Figure 5:
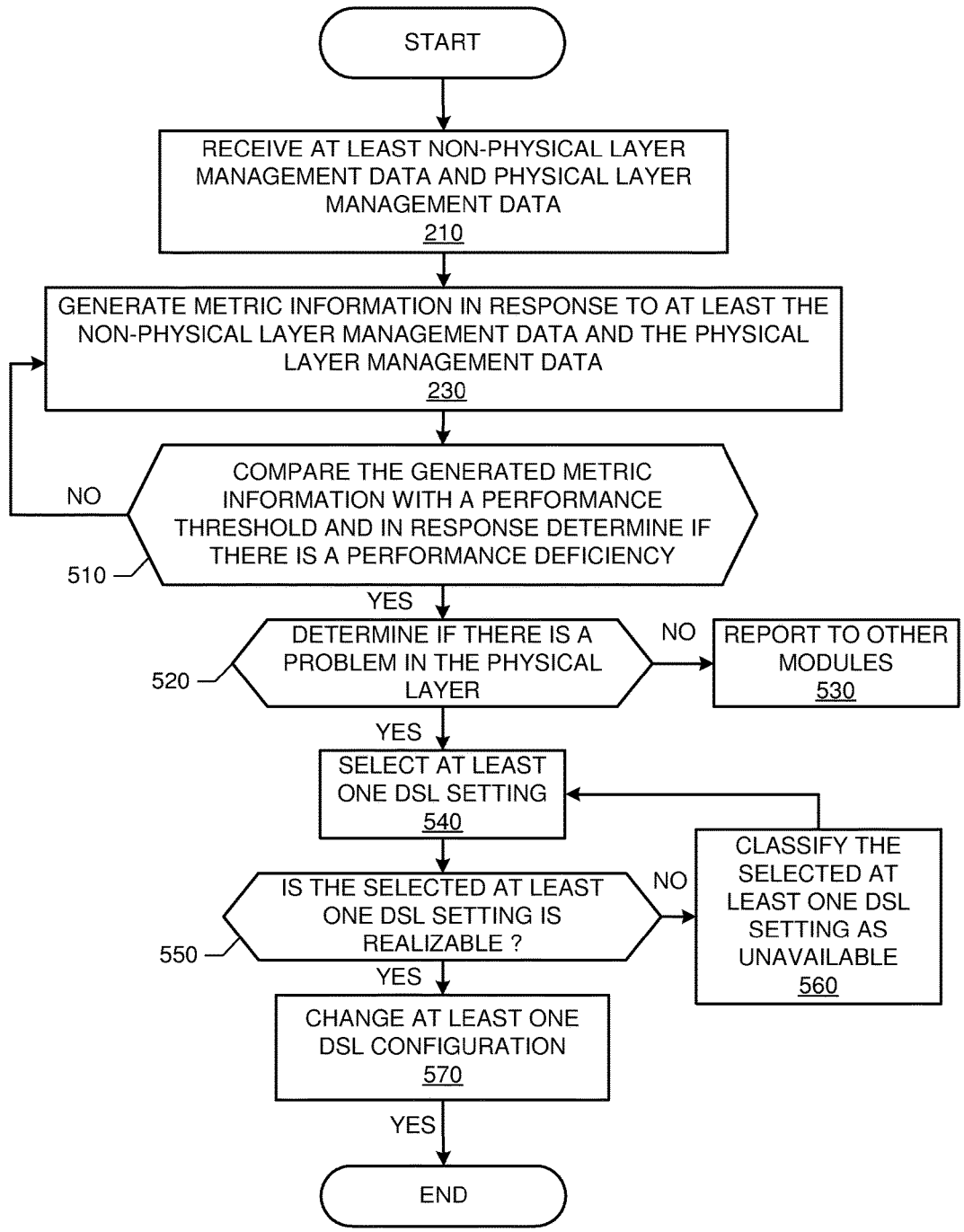
FIG. 5 is a flowchart of a method to diagnose the vide stream over the DSL system according to one embodiment.

FIG. 5 is a flowchart of a method to diagnose video streaming performance over the DSL system 300 according to one embodiment. The method may be carried out by the video stream DSL analyzer 100 shown in FIG. 1, 3 or FIG. 4. However, any other suitable structure may also be used. It will be recognized that the method beginning with step 210 will be described as a series of operations, but the operations may be performed in any suitable order and may be repeated in any suitable combination.

As shown in block 510 of FIG. 5 and in FIG. 4, the performance deficiency identifier 410 is operative to compare the generated metric information 150 with performance threshold information 412. In response, the performance deficiency identifier 410 determines if there is a performance deficiency and optionally produces corresponding performance deficiency information 414. The determination of a performance deficiency has a direct affect on the quality of experience (QoE) or quality of service (QOS). For example, video streaming, such as IPTV, is affected by network effects such as delay, jitter, and loss. The subscriber equipment 332 such as the Set-Top Box (STB) can partially compensate for these effects through the mechanisms of buffering (to compensate for jitter) and error concealment algorithms (to compensate for loss). However, the solution of buffering exacerbates the delay issue, because an increased buffer size affects negatively the channel change time. Thus, performance thresholds may be established in order to determine if a performance deficiency occurs.

The table at the bottom of FIG. 6 lists some exemplary performance objectives that may be used directly or indirectly as performance threshold information 412. For example, the maximum recommended delay may correspond to the performance threshold information 412 and the measured delay may correspond to the generated metric information 150. The maximum recommended delays listed in FIG. 6 are examples only and thus the specific maximum recommended delays or performance threshold information 412 may be any suitable amount depending on the specific requirements, equipment, standards or application. Other information correlating user experience with measures of dropped, repeated and out-of-sequence video frames may be used as well. Examples of minimum application layer bit rate requirements for video and audio are also shown in FIG. 6. The examples of maximum delay in the tables and the examples of minimum bit rate requirements in FIG. 6 are examples of performance threshold information 412 used to determine if there is a performance deficiency, however, any suitable performance requirements and specific requirements levels may be used.

According to yet another embodiment, the performance threshold information 412 is adjusted based on pre-collected data. For example, if the performance threshold proves to be too rigid then the performance threshold information 412 may be relaxed, either automatically without human intervention, or with human interaction, in order to, for example, release system resources, reduce processing burdens or otherwise increase performance speed. According to another embodiment, the performance threshold information is adjusted based on bandwidth usage information. For example, if bandwidth usage is relatively high then the performance threshold criteria may be adjusted in order to increase the quality of service. The user who watches streaming video, such as IPTV twenty-four hours a day, might need a higher quality of service.

Alternatively, the video stream DSL analyzer 100 can adjust the metric information 150 depending on the bandwidth usage. Some metrics may be accumulated from the equipment if and if only the user is actively using the bandwidth. For example, if the error in the video signal is counted only if the user is actively using the video channel, then the impact of the error count varies depending on the bandwidth. According to one embodiment, if the performance threshold information 412 is not adequate to meet the desired QOE or QOS requirements, or if the QOE or QOS requirements change, then the performance threshold information 412 may be adjusted accordingly. For example, the performance threshold information 412 may be related to the QOE or QOS by a mathematical function, or simply by a relational table so that if, for example the QOE or QOS requirement changes, or if the function or relational table itself changes, then the performance threshold information 412 changes automatically without human intervention. If there is no performance deficiency, then processing returns to block 230, otherwise processing proceeds to block 520.

As shown in block 520 and in FIG. 4, the physical layer problem identifier 420 is operative to receive the performance deficiency information 414 and in response determine if there is a problem in the physical layer. The physical layer problem identifier 420 may produce physical layer problem information 422.

FIG. 7 illustrates exemplary DSL error metrics available for VDSL2 according to one embodiment, however any other metrics may be used as well. For example, DSL error metrics, such as one or more of the DSL performance monitoring parameters in FIG. 7 or management data 130, 140 may be compared to a physical layer threshold or to metric information 150 with respect to block 510 in order to determine if there is a problem in the physical layer. These DSL error metrics may be reported in intervals of, for example, 15 minutes, and also for the current and previous 1 day interval, or for any suitable intervals. Examples of time-varying noise include crosstalk from other DSL lines, crosstalk from home networking systems, and interference from other customer premises devices. Any of the above parameters DSL error metrics can aid with detecting video streaming problems at the physical or DSL layer. According to one embodiment, the parameters of CV-C and CV-CFE may be used for the purpose of estimating a quality metric at the DSL layer. Additionally, the ES-L and ES-LFE parameters (counting seconds), may be useful as well.

According to one embodiment, one or more of the parameters listed in FIG. 7 or any other suitable parameters may be combined and compared to the performance criteria provided in FIG. 6. Further, the physical layer threshold may be adjusted in a manner similar to that described above with respect to block 510. If there is no performance deficiency in the physical layer, then a report is made to other modules at block 530, otherwise processing proceeds to block 540.

As shown in block 540 and in FIG. 4, the DSL setting selector 430 is operative to receive the physical layer performance deficiency information 422 and in response select at least one DSL setting to produce DSL setting information 432. The physical layer performance deficiency information 422 and any other suitable metrics obtained using the estimation procedures previously described can help reveal the cases where IPTV degradation is due to the DSL physical layer. After diagnosing the IPTV problem, actions can be recommended to correct the problem, such as by changing DSL setting information 432. According to an alternative embodiment, the DSL setting selector 430 is operative to receive performance deficiency information 414 from the performance deficiency identifier 410.

According to one embodiment, there are two cases for IPTV degradation that should be treated separately. In one case, the DSL problems may be due to time-varying stationary noise. As a response, the provisioned data rate must be adjusted to a setting that prevents a retrain due to the stationary noise.

The second case is the one where the DSL problems emanate from impulse noise on the line. This problem must be handled by adjusting the configuration parameters to increase the impulse noise protection on the line. The configuration parameters may include min/max data rate, maximum delay and minimum impulse noise protection.

A significant difference between ADSL high-speed Internet service and VDSL supporting an IPTV service is that the IPTV service may include a data rate guarantee as opposed to the high-speed Internet service. Thus, any change to the configuration parameters to increase the impulse noise protection must be such that the data rate does not degrade below the guaranteed levels. Alternately, if the impulse noise protection increase inevitably leads to a significantly degraded data rate, then the offered service must be assigned to a different category. The DSL setting selector 430 provides the proposed DSL setting information 432 to the DSL setting realization checker 440 to determine if the DSL settings are valid.

As shown in block 550 and in FIG. 4, the DSL setting realization checker 440 checks to proposed DSL settings. The DSL setting realization checker 440 is operative to receive the DSL setting information 432 and in response, check if the selected at least one DSL setting is realizable and produce DSL setting realization information 442. The DSL setting realization checker 440 may predict the data rate performance that results from different configuration settings related to the impulse noise protection. However, an arbitrary choice of these parameters is not possible, and may lead to configuration errors, an invalid configuration or initialization failures. There are two reasons for such errors/failures:

1. Equipment limitations—Certain configurations settings are impossible to achieve because of resource limitations such as the interleaver (deinterleaver) memory, and the maximum number of RS codewords that can be decoded per unit of time. Such limitations, for example, are described in the ADSL2 and ADSL2+ recommendations. Limitations of the same kind exist in VDSL1 and VDSL2 systems. The corresponding recommendations do not explicitly provide these limitations, however, the known constraints on aggregate interleaver-deinterleaver delay, interleaver depth and (1/S) parameter (see FIGS. 8-9).

2. Performance objectives: Loss of data rate—Note that if the equipment permits a particular setting, the performance objectives may not be realizable and as a result new DSL setting information 432 is required. For example, increasing the impulse noise protection capability often requires increasing the number of parity bytes per RS codeword. Such an increase leads to additional redundancy, which implies that the net available data rate is correspondingly decreased. In other words, the extra offered protection may come at a price of a smaller net coding gain.

The DSL setting realization checker 440 may check any combination of 1) equipment and 2) performance objectives according to this embodiment. Using the above observations and the corresponding DSL setting realization information 442, the DSL setting selector 430 recommends a new configuration with, according to this example, increased impulse noise protection at block 560:

For a given desired data rate, choose an INP_min and delay_max combination satisfying the following conditions:
a) The new INP_min must be higher than the previous INP_min.
b) The INP_min and delay_max combination must be such that they are achievable for the desired data rate and for the given equipment. This can be accomplished using tables such as the ones in FIGS. 8 and 9.

For a given desired data rate and the chosen INP_min and delay_max combination estimate the difference between the current net coding gain and the previous net coding gain. This difference provides a measure of the "loss" due to increased protection. If the current SNR margin is insufficient compared to this "loss", then this choice of INP_min and delay_max would lead to the line failing to initialize. Knowing the difference in the net coding gain can prevent this situation. Methods to compute the net coding gain are described next.

Estimating the Net Coding Gain

Figure 10:
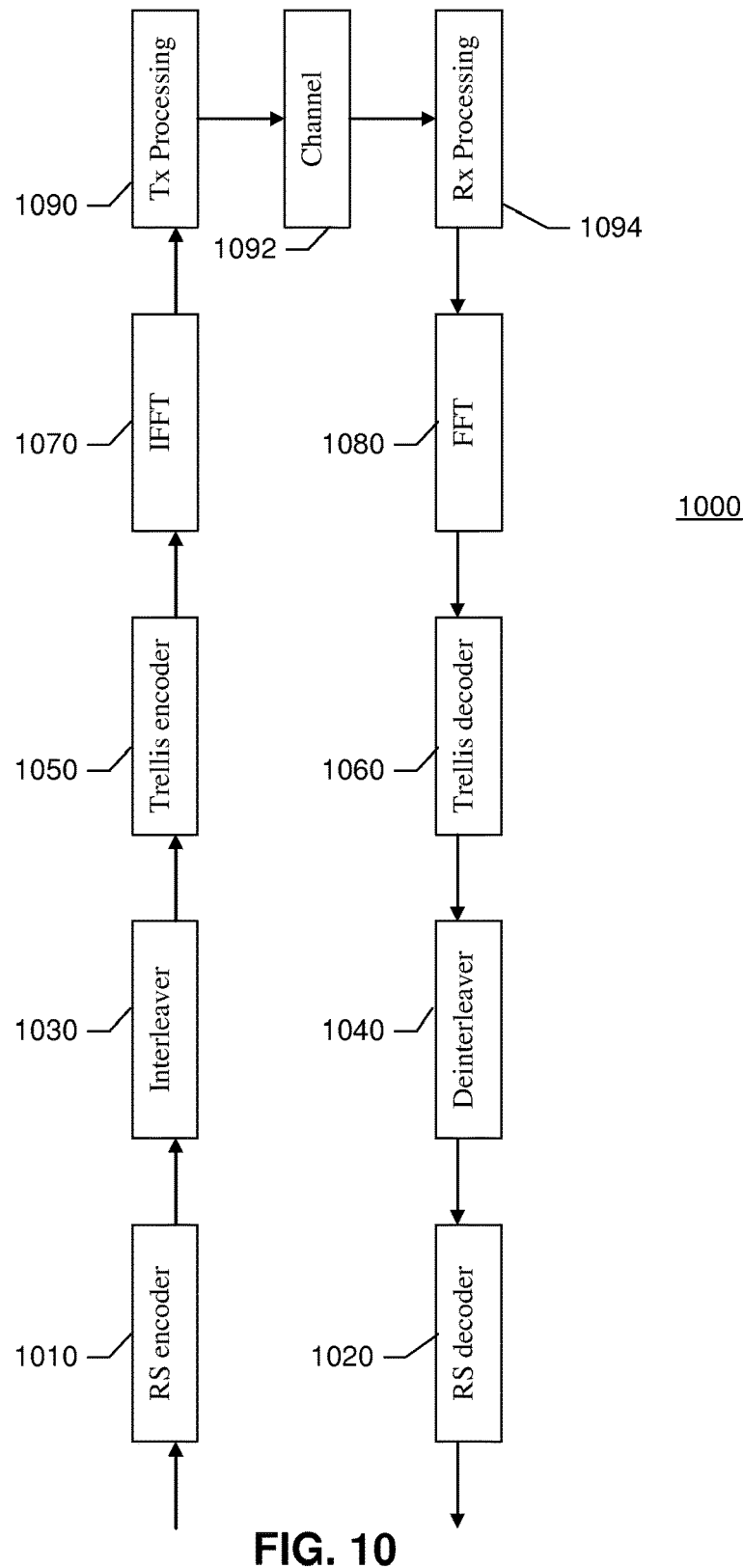
FIG. 10 is a block diagram of DSL concatenated coding according to one embodiment.

FIG. 10 is a block diagram of DSL concatenated coder and decoder 1000 for calculating net coding gain according to one embodiment. An example calculation of the net coding gain to check the DSL setting information 432 is provided. The net coding gain may be used by the video stream DSL analyzer 100 or any suitable DSL Optimizer or DSL management center to check the DSL setting information 432.

As shown in FIG. 10, in ADSL1, ADSL2, ADSL2+, and VDSL2, the concatenated coder and decoder consists of an outer RS coder 1010, an RS decoder 1020 and a concatenation of an inner trellis coder 1030, 1040 (for example, a 16-state, 4-dimensional code, developed by Wei). An interleaver 1030 is placed between the RS encoder 1010 and a trellis encoder 1050, and a deinterleaver 1040 is placed between the trellis decoder 1060 and the RS decoder 1020.

It is assumed that the codeword size, N, and the number of payload bytes, K, of the RS code are known. (These can be obtained from reported values, or from assembled tables, or from algorithm descriptions for a particular implementation.) It is also assumed that the errors occurring at the RS decoder 1020 are random. It is also assumed that the desired data rate is R. The coding gain can be expressed in dB as the addition of three terms:

$$\gamma_{c,dB} = \gamma_{tc,dB} + \tilde{\gamma}_{rs,dB} - \gamma_{loss,dB}$$

$\gamma_{tc,dB}$ is the net coding gain from the use of the trellis code.
$\gamma_{rs,dB}$ is the gross coding gain from the use of the RS code.
$\gamma_{loss,dB}$ is the coding gain loss (due to redundancy) from the use of the RS code.

The coding gain loss can be expressed as:

$$\gamma_{loss,dB} = b_{extra} \cdot 3 = R \cdot \frac{N-K}{K} \cdot \frac{3}{4000 \cdot N_{used\_tones}}$$

If the DSL setting information 432 is not realizable based on for example any combination of 1) the equipment configuration, 2) performance objectives, or 3) the required coding gain, then processing proceeds to block 560 to classify the selected at least one DSL setting as unavailable and another DSL setting with new DSL setting information 432 is selected at block 540. If the DSL setting information 442 is realizable, then processing proceeds to block 570.

As shown in block 570 and FIG. 4, the DSL setting configurator 450 according to this embodiment, receives the DSL setting realization information 442 and in response produces the DSL configuration data 160. The NMS 390 receives the DSL configuration data 160 and performs the requested configuration change.

Figure 11:
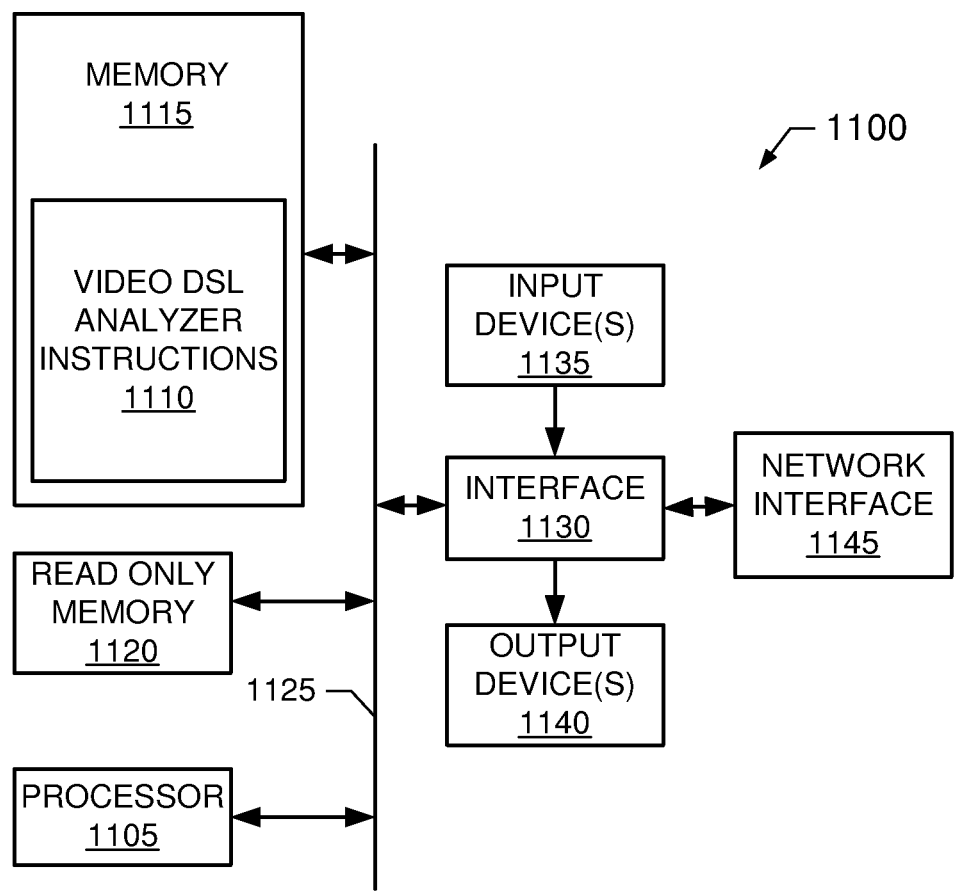
FIG. 11 is a block diagram of an example processor platform according to one embodiment.

FIG. 11 is a block diagram of an example processor platform 1100 that may be used or programmed to implement the example video stream DSL analyzer 100. For example, the processor platform 1100 can be implemented by one or more general purpose processors, cores, microcontrollers, 1105 etc. The processor 1105 executes video DSL analyzer instructions 1110 contained in main memory 1115 (e.g., within a random access memory (RAM)) to implement the example video stream DSL analyzer 100. The processor 1105 may be any type of processing unit, such as a DSP, a RISC processor, or a general purpose or customized processor from the INTEL®, AMD®, SUN®, IBM® families of cores, processors or microcontrollers.

The processor 1105 is in communication with the main memory 1115 (such as a read only memory (ROM) 1120 or hard drive) via a bus 1125. The RAM 1115 may be implemented by dynamic random access memory (DRAM), Synchronous DRAM (SDRAM), or any other type of RAM device, and ROM 1120 may be implemented by flash memory or any other desired type of memory device. The output devices 1140 may be used, for example, to display or provide a GUI.

It should also be noted that the example software or firmware implementations described herein are may be stored on an optional tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software or firmware described herein can be stored on a tangible storage medium or distribution medium such as those described above or equivalents and successor media. According to an alternative embodiment, the video DSL analyzer instructions 1110 may be wirelessly transmitted to the memory 1115 for example, via a wide area wireless access network (WWAN), such as a wireless communication or WiMax network, or a local wireless access network (LWAN) such as WiFi network.

Of course, persons of ordinary skill in the art will recognize that the order, size, and proportions of the memory 1115 illustrated in the example systems may vary. It is contemplated that any or all of these hardware and software components could be embodied exclusively in hardware, exclusively in software, exclusively in firmware or in some combination of hardware, firmware or software. Accordingly, persons of ordinary skill in the art will readily appreciate that the above described examples are not the only way to implement such systems.

According to one embodiment, dedicated hardware implementations including, but not limited to, an ASIC, programmable logic arrays and other hardware devices can likewise be constructed to implement some or all of the example methods or apparatus described herein, either in whole or in part. Furthermore, alternative software implementations including, but not limited to, distributed processing or component/object distributed processing, parallel processing, or virtual machine processing can also be constructed to implement the example methods or apparatus described herein.

Figure 12:
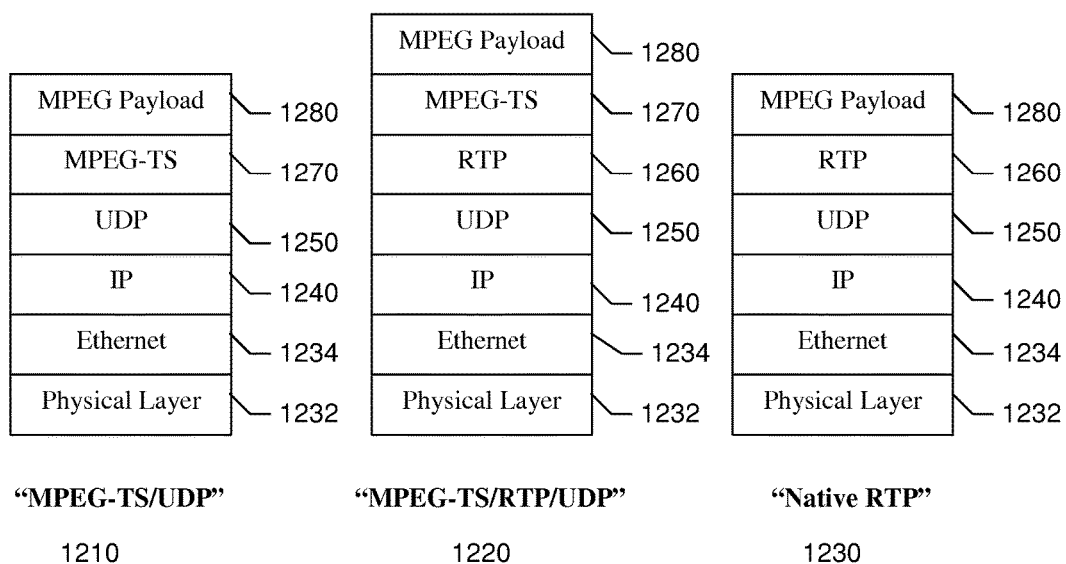
FIG. 12 illustrates three exemplary alternative network layering schemes according to one embodiment.

FIG. 12 illustrates three exemplary alternative network layering schemes for IPTV: MPEG-TS/UP 1210, MPEG-TS/RTP/UDP 1220, and Native RTP 1230. FIG. 12 shows examples of non-physical layer management data 130 and physical layer management data 140 are provided. There is no single unique specification for the delivery of video streaming such as IPTV streaming, and thus other suitable layer schemes may be used. Thus, the video stream DSL analyzer 100 may support any other suitable video streaming schemes and any other future video streaming schemes.

The physical layer 1232 protocol depends on the underlying physical medium. There are at least three segments with different technologies that may be used:

i. Backbone. Backbone optical links are characterized by probabilities of bit error lower than 10-10 (10^ {−10}.

ii. Last (First) Mile. Some examples of VDSL transmission over copper pairs with the Ethernet layer are provided below: VDSL1, VDSL2, VDSL for EFM (Ethernet-in-the-First-Mile)

The interface between the VDSL transceiver and the Ethernet layer 1234 is typically called the γ-interface. This is an interface between the TPS-TC (Transmission Protocol Specific-Transmission Convergence) function and the "User application I/F". VDSL1 defines a TPS-TC for Packet Transfer Mode (called PTM-TC) based on HDLC encapsulation. This mode can be used to transport Ethernet traffic. VDSL2 defines a TPS-TC for Ethernet and generic packet transport (PTM-TC). This mode uses 64/65 encapsulation. The EFM standard for VDSL (called 10PASS-TS) is an IEEE specification for an Ethernet system based on the VDSL1 standards.

Figure 13:
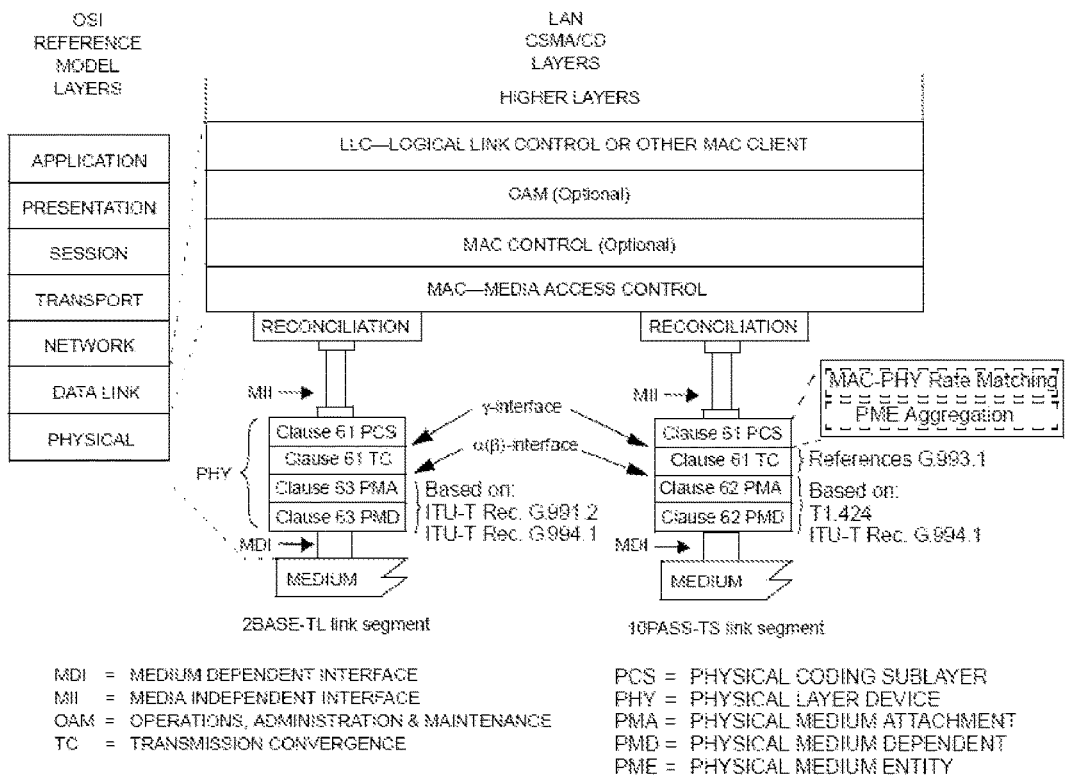
FIG. 13 illustrates an exemplary architecture of EFM (Ethernet-in-the-First-Mile) over a telephone line according to one embodiment.

FIG. 13 illustrates an exemplary architecture of EFM (Ethernet-in-the-First-Mile) over a telephone line 315. EFM uses slightly different naming for the various functions. The γ-interface is positioned between the Transmission Convergence (TC) and the Physical Coding SubLayer (PCS) functions.

The Ethernet layer 1234 includes the Media Access Control (MAC) layer and has the frame format as described in IEEE Standard 802.3-2002, Local and metropolitan area networks, Part 3: Carrier Sense Multiple Access with Collision Detection (CSMA/CD) Access Method and Physical Layer Specifications, Mar. 8, 2002. The payload (MAC client) data can vary between 46 and 1500 bytes. Ethernet frames have a Frame Check Sequence, which can be used for detecting errors. For video streaming applications, such as IPTV, the payload data contain IP packets.

The IP layer 1240 provides two basic functions: addressing and fragmentation/reassembly. Flow control, error control for data, and connection or virtual circuits may be provided. According to one embodiment, the Internet Group Management Protocol, is used for IP multicasting, where an IP packet is transmitted to multiple destination hosts by using a single IP destination address. A group of destination hosts is defined as a multicast host group, and the membership of a host group is dynamic. The IGMP protocol is used by IP hosts to report their multicast group memberships to immediately neighboring multicast routers.

The User Datagram Protocol (UDP) 1250 provides a means for application programs to send messages to other programs with a minimum of protocol mechanism. Delivery and duplicate protection may or may not be guaranteed.

The Real Time Protocol (RTP) 1260 provides end-to-end network transport functions for applications transmitting real-time data such as audio and video. According to one embodiment, resource reservation may be available. Each RTP stream must carry timing information used at the client side to synchronize multiple streams if needed. An RTP header carries a sequence number that may be used by the receiver to detect packet loss and to restore the packet sequence. According to an alternative embodiment, the RTP 1260 also includes a control protocol (Real Time Control Protocol, RTCP) for monitoring the data delivery. Its primary function is to provide feedback on the quality of the data delivery, and is considered to be an integral part of the protocol. The Native RTP method 1230 carries AVC video and AAC audio over RTP. In contrast to MPEG-TS 1210, 1220, different RTP streams are used for video and audio transport. Typically, a single NAL unit is mapped to an RTP packet. This allows an intelligent mapping of video packets to transport packets, so that video packets are not split over two UDP packets.

The MPEG-2 Transport Streams (MPEG-TS) 1270 are described in ISO/IEC 13818-1:2000 (ITU Recommendation H.222.0), generic coding of moving pictures and associated audio information: Systems, October 2000. According to this embodiment, the MPEG-TS 1270 is composed of packets with 188 bytes, containing a 4 byte header, however any suitable packet format may be used. The packet payloads contain program information and Packetized Elementary Streams (PES), which transport the video and audio information. Thus, a transport stream contains multiplexed data: audio, video and program information. Regarding the MPEG-TS/UDP approach 1210 for IPTV streaming, the MPEG Transport Streams are carried directly as the payload of the UDP datagram. As shown in FIG. 12, the MPEG-TS/RTP/UDP method 1220 uses the RTP payload to carry a number of MPEG-TS packets.

Regarding the MPEG payload layer 1280, an Advanced Video Codec (AVC) has been developed by the MPEG group, and has been published as the ITU Recommendation H.264 in ITU-T Recommendation H.264, Advanced video coding for generic audiovisual services, May 2005. It is also known as MPEG-4 part 10, and is adopted by the DVD forum, Blue-ray Disk Association, DVB, 3GPP and ISMA. According to one embodiment, AVC segments each picture into slices. A picture slice contains a number of macroblocks. A macroblock corresponds to 16.times.16 pixels of the picture. Macroblocks are encoded in intra or inter mode. The output of the encoder is encapsulated in Network Abstraction Layer (NAL) units. The Advanced Audio Codec has been standardized by the MPEG group in ISO/IEC 14496-3:1999, "Coding of Audio-Visual Objects—Part 3: Audio, 1999", and is currently used by iTunes and XM satellite radio, and is adopted by 3GPP, ISMA and DVB.

Figure 14:
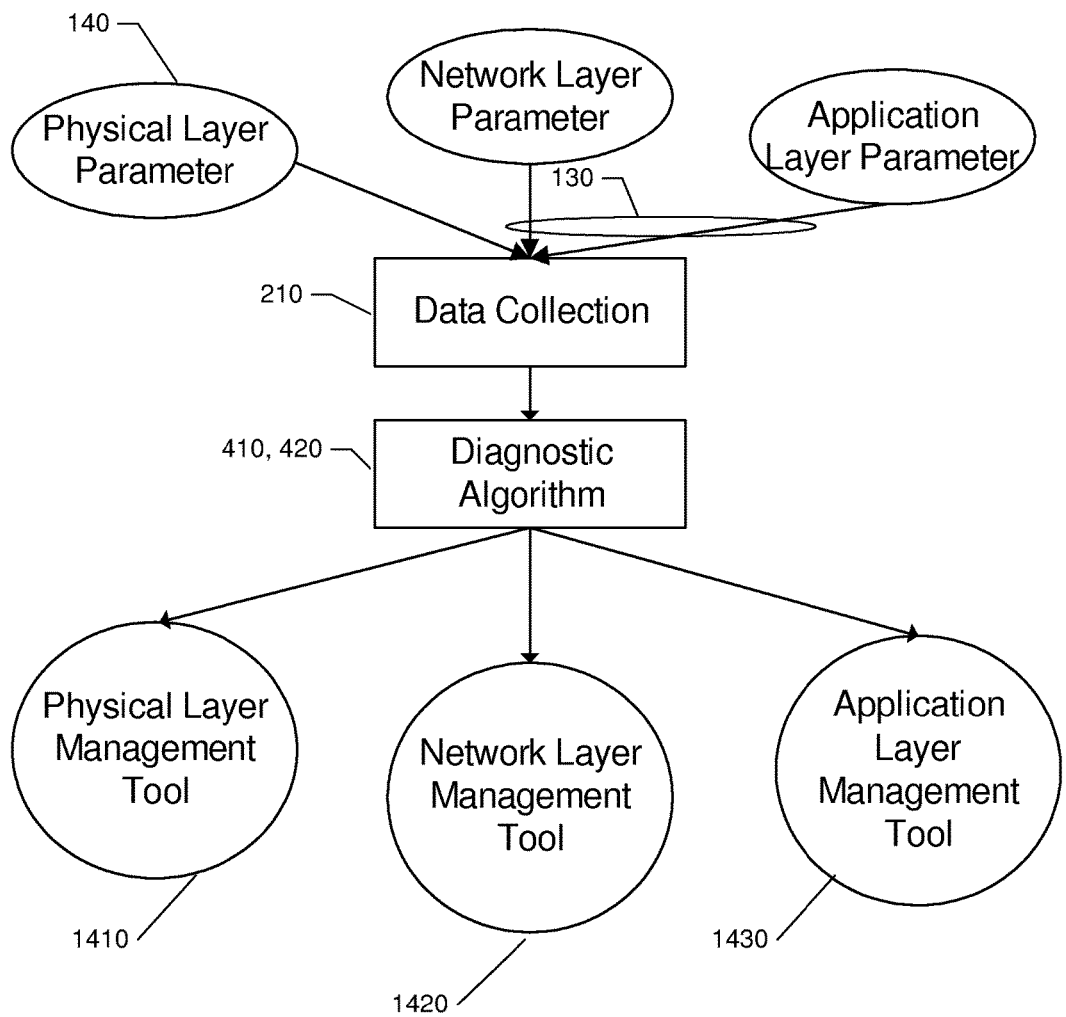
FIG. 14 is a flowchart for diagnosing multiple communication layers according to one embodiment.

FIG. 14 is a flowchart for diagnosing multiple communication layers according to one exemplary embodiment. According to this embodiment, the non-physical layer management data 130 corresponds to network layer and application layer data. However, this data may conform to all or part of the Open Systems Interconnection Basic Reference Model (OSI). Further, diagnosis and management of the physical layer is performed in block 1410, diagnosis of the network layer is performed in block 1420 and diagnosis of the application layer is performed in block 1430. However, diagnosis for any combination of physical and non-physical layers may be performed. For example, diagnosis of the physical layer at block 420 and the application layer at block 1430 is performed in response to the physical layer management data 140 and the non-physical layer management data 130.

To the extent the above specification describes example components and functions with reference to particular devices, standards or protocols, it is understood that the teachings of the invention are not limited to such devices, standards or protocols. For instance, DSL, ADSL, VDSL, HDSL, G.dmt, G.hs, G.ploam, TR-069, Ethernet, DSPs, IEEE 802.11x, and IEEE 802.3x represent examples of the current state of the art. Such systems are periodically superseded by faster or more efficient systems having the same general purpose. Accordingly, replacement or future devices, standards or protocols having the same general functions are equivalents which are intended to be included within the scope of the accompanying claims.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

A video stream DSL analyzer is provided which comprises: means operative to receive at least non-physical layer management data and physical layer management data;

means operative to generate metric information in response to at least the non-physical layer management data and the physical layer management data, wherein the generating means is coupled to the receiving means; and means operative to change a DSL configuration in response to the generated metric information. In some embodiments, the video stream DSL analyzer further comprises: means operative to directly set the metric information data to at least one of the received management data, wherein the setting means is coupled to the receiving means; means operative to group the received management data for a corresponding timeslot, wherein the grouping means is coupled to the directly setting means; and means operative to set the metric information to a function of at least two of the received management data, wherein the setting means, is coupled to the grouping means. In some embodiments, the video stream DSL analyzer comprises: means operative to compare the generated metric information with a performance threshold and in response determine if there is a performance deficiency, wherein the comparing means is coupled to the generating means. In some embodiments, the video stream DSL analyzer comprises: means operative to group the received management data for a corresponding timeslot, wherein the grouping means is coupled to the receiving means; and means operative to determine if there is a problem in the physical layer, wherein the determining means is coupled to the grouping means.

We claim:

1. A method for diagnosing a video stream delivered over a digital subscriber line (DSL) network comprising:
    receiving layer management data for at least non-physical layer management data and physical layer management data corresponding to the video stream;
    generating metric information, by a video stream analyzer, in response to receiving the at least non-physical layer management data and physical layer management data, wherein generating the metric information further comprises grouping the received layer management data to a corresponding timeslot, and wherein the video stream analyzer is operable to generate the metric information based on any two of layer management data of the non-physical layer management data and physical layer management data;
    comparing the generated metric information with a performance threshold and determining whether there is a performance deficiency based on the comparison;
    determining whether there is a problem in the network in response to determining there is the performance deficiency; and
    selecting at least one DSL setting in the DSL network in response to determining there is the problem in the network.

2. The method as in claim 1, wherein the non-physical layer management data corresponds with data associated with at least one of:
    an Ethernet, Internet Protocol (IP),
    User Datagram Protocol (UDP),
    Real Time Protocol (RTP),
    Moving Picture Experts Group Transport Streams MPEG-TS,
    Moving Picture Experts Group (MPEG) Payload,
    data,
    link,
    network,
    transport,
    session, or
    presentation and application layer.

3. The method as in claim 2, wherein the non-physical layer management data is at least one of:
    subscriber bandwidth usage,
    MPEG error data, packets received,
    bytes received,
    packets lost,
    fraction lost,
    corrupted packets,
    overruns,
    underruns,
    receive interarrival jitter,
    average receive interarrival, packets received, or
    packet discontinuity counter.

4. The method as in claim 1, wherein the physical layer management data is a parameter from a DSL physical layer, wherein the parameter is at least one of:
    reported INP,
    reported delay,
    reported data rate,
    full inits counter,
    failed full inits counter,
    short inits counter,
    failed short inits counter,
    FECS-L counter,
    ES-L counter,
    SES-L counter,
    LOSS-L counter,
    UAS-L counter,
    FEC S-LFE counter,
    ES-LFE counter,
    SES-LFE counter,
    LOSS-LFE counter,
    UAS-LFE counter,
    CV-C counter,
    FEC-C counter,
    CV-CFE counter,
    FEC-CFE counter,
    CRC-P counter,
    CRCP-P counter,
    CV-P counter,
    CVP-P counter
    CRC-PFE counter,
    CRCP-PFE counter,
    CV-PFE counter, or
    CVP-PFE counter.

5. The method as in claim 1, wherein the performance threshold is adjusted based on pre-collected data.

6. The method as in claim 1 comprising receiving bandwidth usage information and in response adjusting the performance threshold.

7. The method as in claim 1 comprising: determining if at least one of error recovery and error concealment at a video streaming client can adequately mitigate the determined performance deficiency and in response, changing the at least one DSL setting to perform at least one of: error recovery and error concealment.

8. The method as in claim 7, wherein if the error recovery and error concealment at the streaming video client can adequately mitigate the performance deficiency, then determining if there is a problem in a physical layer.

9. The method as in claim 1 comprising selecting at least one DSL setting and in response, checking if the selected at least one DSL setting is realizable.

10. The method as in claim 9 comprising estimating net coding gain and in response, determining if the at least one DSL setting is realizable.

11. The method as in claim 9 comprising changing the at least one DSL setting when the at least one DSL setting is realizable.

12. The method as in claim 11, wherein the at least one DSL setting is at least one of:
- min INP,
- max delay,
- target data rate,
- maximum data rate,
- minimum data rate,
- target noise margin,
- maximum noise margin, or
- minimum noise margin, for at least one of: both upstream and downstream.

13. The method as in claim 1, wherein the video stream is at least one of:
- video and audio stream,
- television stream, or
- Internet Protocol Television (IPTV) stream.

14. A non-transitory computer readable medium containing instructions executable by one or more processors to:
- receive layer management data for at least non-physical layer management data and physical layer management data corresponding to a video stream delivered over a digital subscriber line (DSL) network;
- generate metric information, by a video stream analyzer, in response to receiving the at least non-physical layer management data and physical layer management data, wherein to generate the metric information further comprises grouping the received layer management data to a corresponding time slot, and wherein the video stream analyzer is operable to generate the metric information based on any two of layer management data of the non-physical layer management data and physical layer management data;
- compare the generated metric information with a performance threshold and determining whether there is a performance deficiency based on the comparison;
- determine whether there is a problem in the network in response to determining there is the performance deficiency; and
- select at least one DSL configuration in response to determining there is the problem in the network.

15. The non-transitory computer readable medium of claim 14, further containing instructions to verify a performance efficiency gain and precision after changing at least one DSL configuration and in response determining there is the problem in a physical layer.

16. A system comprising:
- a metric information generator operable to generate metric information of a video stream based on physical layer management data and non-physical management data;
- a performance deficiency identifier operable to generate performance deficiency information based on the metric information and performance threshold information;
- a physical layer problem identifier operable to generate physical layer deficiency information based on the performance deficiency information;
- a DSL setting selector operable to generate DSL setting information based on a combination of the performance deficiency information, the physical layer deficiency information and DSL setting realization information;
- a DSL setting realization checker operable to generate the DSL setting realization information that determines if a selected at least one DSL setting is valid and available; and
- a DSL setting configurator operable to generate DSL configuration data based on the DSL setting realization information, causing a change to at least one DSL configuration.

17. The system as in claim 16, wherein the selected at least one DSL setting is classified as unavailable by the DSL setting realization checker, if the DSL setting information is not realizable based on equipment configuration and performance objectives and coding gain.

18. The system as in claim 16 wherein the metric information generator is operable to generate metric information by the following methods: (1) directly setting the metric information based on at least one of received physical layer management data and non-physical management data, (2) grouping the received physical layer management data and non-physical management data for a corresponding timeslot to translate the received physical layer management data and non-physical management data, and (3) computing the metric information as a function of at least two of the received physical layer management data and non-physical management data.

19. The system as in claim 16, wherein if the performance threshold information is not adequate to meet a desired QOS requirement, or if the desired QOS requirement changes, then the performance threshold information is adjusted in order to meet the QOS requirement.

20. The system as in claim 16, wherein the DSL setting realization checker predicts data rate performance that results from different configuration settings.

* * * * *